United States Patent
Choi et al.

(10) Patent No.: US 11,541,773 B2
(45) Date of Patent: Jan. 3, 2023

(54) APPARATUS AND METHOD FOR ASSIGNING CHARGER TO ELECTRIC VEHICLES

(71) Applicant: LG Electronics Inc., Seoul (KR)

(72) Inventors: Junghwa Choi, Seoul (KR); Yeonjung Kim, Seoul (KR); Kyungyul Kim, Seoul (KR); Minkook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 279 days.

(21) Appl. No.: 16/839,199

(22) Filed: Apr. 3, 2020

(65) Prior Publication Data

US 2021/0206286 A1    Jul. 8, 2021

(30) Foreign Application Priority Data

Jan. 7, 2020  (KR) .................. 10-2020-0002071

(51) Int. Cl.
| | |
|---|---|
| *H02J 7/00* | (2006.01) |
| *B60L 53/68* | (2019.01) |
| *B60L 53/66* | (2019.01) |
| *G01C 21/34* | (2006.01) |
| *G06N 20/10* | (2019.01) |
| *G06Q 10/02* | (2012.01) |

(52) U.S. Cl.
CPC ............... *B60L 53/68* (2019.02); *B60L 53/66* (2019.02); *G01C 21/3469* (2013.01); *G06N 20/10* (2019.01); *G06Q 10/02* (2013.01); *B60L 2240/62* (2013.01); *B60L 2240/72* (2013.01)

(58) Field of Classification Search
CPC ...... B60L 53/66; B60L 53/68; B60L 2240/62; B60L 2240/72; G01C 21/3469; G06N 20/10; G06Q 10/02
USPC ............................................. 320/109; 701/22
See application file for complete search history.

(56) References Cited

U.S. PATENT DOCUMENTS

| | | | | |
|---|---|---|---|---|
| 2011/0032110 | A1* | 2/2011 | Taguchi | G01C 21/3697 340/636.1 |
| 2015/0286965 | A1* | 10/2015 | Amano | B60L 53/68 705/5 |
| 2018/0111494 | A1* | 4/2018 | Penilla | G06Q 30/0238 |

* cited by examiner

*Primary Examiner* — Zixuan Zhou
(74) *Attorney, Agent, or Firm* — Fish & Richardson P.C.

(57) ABSTRACT

The present invention relates to a method and an apparatus for assigning chargers to electric vehicles. The method comprises clustering chargers into at least one charger cluster, receiving charging reservation requests from the electric vehicles during a predetermined period of time, clustering the electric vehicles into at least one electric vehicle cluster, determining a charging priority between the electric vehicles based on the at least one electric vehicle cluster and assigning the chargers to the electric vehicles based on the determined charging priority. As a result of this, an efficient charging reservation is proposed to a user, so that it is possible to help the user utilize time efficiently.

20 Claims, 18 Drawing Sheets

10  31  33  20

APPARATUS AND METHOD FOR ASSIGNING CHARGER TO ELECTRIC VEHICLES

CROSS-REFERENCE TO RELATED APPLICATION

Pursuant to 35 U.S.C. § 119(a), this application claims the benefit of earlier filing date and right of priority to Korean Patent Application No. 10-2020-0002071, filed on Jan. 7, 2020, the contents of which is hereby incorporated by reference herein in its entirety.

BACKGROUND

With the increase of government support for eco-friendly vehicles, the number of electric vehicles is increasing. However, charger infrastructure capable of charging the electric vehicle is growing slowly compared to the increase rate of the number of the electric vehicles.

Therefore, if an electric vehicle user does not have a plan in advance of where to charge for long-distance travel, the user may have a problem that the vehicle is fully discharged. Also, even if the user has the plan beforehand, the user may wait for a long time in front of the charger.

SUMMARY

Various embodiments of the present disclosure relate to a method and an apparatus for assigning a charger to electric vehicles which request a charging reservation.

In order to prevent the above-described situations in advance, it is necessary to provide a service by assigning one of the chargers located on the route that the user's electric vehicle travels to the user's electric vehicle.

Various embodiments of the present disclosure can provide a method for assigning in advance the charger to the user who wants a reservation and can provide an apparatus for the same.

Various embodiments of the present disclosure can provide a method which divides a service area in units of an idle charger on a highway and assigns the charger to the user in consideration of the destination of the user and the degree of charging of the electric vehicle, and can provide an apparatus for the same.

Various embodiments of the present disclosure can provide a method which analyzes charging data from each charger and arranges charging stations in accordance with actual demand situation.

Various embodiments of the present disclosure can provide a method which provides additional services such as point accumulation by each user and fare discount benefit, thereby promoting the activation of a reservation charging infrastructure.

The technical problem to be overcome in this document is not limited to the above-mentioned technical problems. Other technical problems not mentioned can be clearly understood from those described below by a person having ordinary skill in the art.

According to various embodiment of the present disclosure, a method for assigning chargers to electric vehicles is provided, which comprises clustering chargers into at least one charger cluster, receiving charging reservation requests from the electric vehicles during a predetermined period of time, clustering the electric vehicles into at least one electric vehicle cluster based on the received charging reservation requests, determining a charging priority between the electric vehicles based on the at least one electric vehicle cluster and assigning the chargers to the electric vehicles based on the determined charging priority.

According to various embodiment of the present disclosure, an electronic device is provided, which comprises a communication device configured to receive charging reservation requests from electric vehicles, a memory configured to store data and programs required for operation and at least one processor configured to connect to the communication device and the memory. The at least one processor is configured to perform operations including clustering chargers into at least one charger cluster and storing the at least one charger cluster in the memory, receiving the charging reservation requests from the electric vehicles through the communication device during a predetermined period of time, clustering the electric vehicles into at least one electric vehicle cluster based on the received charging reservation requests, determining a charging priority between the electric vehicles based on the at least one electric vehicle cluster and assigning the chargers to the electric vehicles based on the determined charging priority.

According to various embodiments, an efficient charging reservation is proposed to a user, so that it is possible to help the user utilize time efficiently.

According to various embodiments, the efficiency of the use of each charger is maximized and the degree of use of each charger is normalized, so that it is possible to prevent the breakdown, etc., of a specific charger caused by the frequent use of the specific charger.

According to various embodiments, the optimized arrangement of the charging stations is proposed through the analysis of obtained charging data, so that the profits of business operators can be enhanced.

Advantageous effects that can be obtained from the present disclosure is not limited to the above-mentioned effects. Further, other unmentioned effects can be clearly understood from the following descriptions by those skilled in the art to which the present disclosure belongs.

BRIEF DESCRIPTION OF THE DRAWINGS

With regard to the description of the drawings, the same or similar reference numerals may be used for the same or similar components.

DETAILED DESCRIPTION OF THE DISCLOSURE

Figure 1:
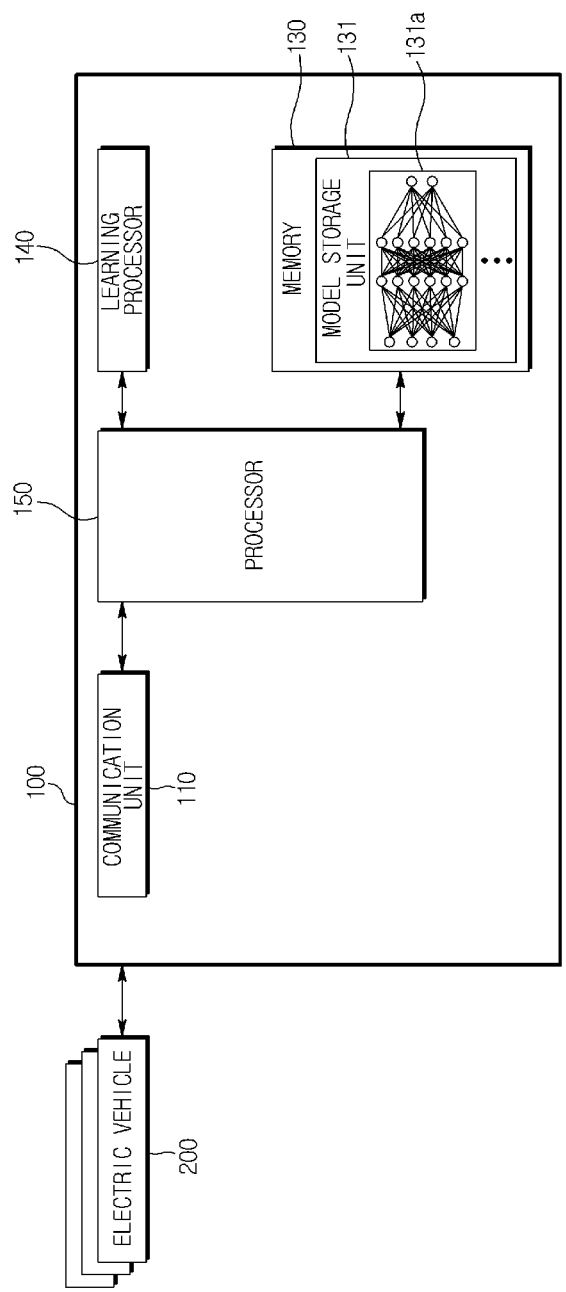
FIG. 1 is a view showing a configuration of an electronic device which assigns a charger to an electric vehicle in accordance with various embodiments.

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

A suffix "module" or "part" for the component, which is used in the following description, is given or mixed in consideration of only convenience for ease of specification, and does not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present invention may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

In the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present invention are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

FIG. 1 is a view showing a configuration of an electronic device 100 which assigns a charger to an electric vehicle in accordance with various embodiments.

The electronic device 100 shown in FIG. 1 is shown as an embodiment. Each component of the electronic device may be configured with one chip, part, or electronic circuit or configured by combining chips, parts, or electronic circuits. According to another embodiment, some of the components shown in FIG. 1 may be divided into several components and may be configured with different chips, parts or electronic circuits. Also, several components are combined and configured with one chip, part, or electronic circuit. According to further another embodiment, some of the components shown in FIG. 1 may be removed or components not shown in FIG. 1 may be added.

According to the embodiment, the electronic device 100 may be one or more servers that exist on the network. When the electronic device 100 is configured with a plurality of servers, the below-described functions of the electronic device 100 may be distributed across the plurality of servers and performed.

Referring to FIG. 1, the electronic device 100 may include a communication unit 110, a memory 130, a learning processor 140, and a processor 150.

The communication unit 110 can transmit and receive data to and from an external electronic device 200. The external electronic device 200 may be an electronic device such as a mobile phone, a smart phone, a laptop computer, an artificial intelligence device for digital broadcasting, a personal digital assistant (PDA), a portable multimedia player (PMP), a navigation system, a slate PC, a tablet PC, an ultrabook, a wearable device (e.g., a watch type artificial intelligence device (a smartwatch), a glass-type artificial intelligence device (smart glasses), and a head mounted display (HMD). The external electronic device 200 can execute applications that perform related functions, for example, electric vehicle charger reservation, in accordance with methods proposed by embodiments of the present disclosure.

The communication unit 110 can support various wired and wireless communication methods. For example, the communication unit 110 can transmit and receive data on the basis of at least one communication method among Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless Universal Serial Bus (USB), Ethernet, local area network (LAN).

The communication unit 110 can receive a charger reservation request message from the external electronic device 200.

The communication unit 110 can transmit and receive a message for charger reservation to and from the external electronic device 200 in accordance with the request of the processor 150. According to the embodiment, the communication part 110 may transmit information on a charger that can be reserved and a message requesting confirmation of the reservation to the external electronic device 200. The communication unit 100 may receive a reservation confirmation message or a reservation rejection message from the external electronic device 200. According to another embodiment, the communication unit 110 may transmit a yielding request message to the external electronic device 200 and may receive a response message to the yielding request message from the external electronic device 200.

The memory 130 may store data supporting various functions of the electronic device 100. The memory 130 may store a plurality of application programs or applications which are executed in the electronic device 100, data for the operation of the electronic device 100, commands, and data for the operation of the learning processor 140 (e.g., information on at least one algorithm for machine learning, etc.)

The memory 130 may include a model storage unit 231 which stores a model based on an artificial neural network. The model storage unit 231 may store an artificial neural network model 131a which is learning or has learned through the learning processor 140.

The processor 150 may determine or predict at least one operation of the electronic device 100, which is determined by using data analysis and a machine learning algorithm or is executable based on the generated information. For this, the processor 150 may request, search, receive or utilize the data of the learning processor 140 and may control the electronic device 100 such that operations which are predicted or are determined to be desirable among the at least one executable operation are performed.

The processor 150 may perform various functions for implementing intelligent emulation (i.e., a knowledge-based system, an inference system, and a knowledge acquisition system). This can be applied to various types of systems (e.g., fuzzy logic systems), including an adaptive system, a machine learning system, an artificial neural network, and the like.

In order to collect information for processing and storage in the learning processor 140, the processor 150 may be configured to collect, sense, extract, detect and/or receive signals or data which are used for data analysis and a machine learning task through one or more sensing components from the electronic device 100.

The information collection may include sensing information through a sensor, extracting information stored in memory 130, or receiving information from another electronic device, entity, or external storage device via a communication means.

The processor 150 may collect and store use history information of the electronic device 100.

The processor 150 may determine the best match for performing specific functions by using the stored use history information and a predictive modeling.

The processor 150 can communicate with the external electronic device 200 through the communication unit 110.

The processor 150 may collect information in real time, process or classify the information (e.g., a knowledge graph, a command policy, a personalized database, a conversation engine, etc.), and store the processed information in the memory 130 or in the learning processor 140.

When the operation of the electronic device 100 is determined based on the data analysis, machine learning algorithm, and technologies, the processor 150 may control the components of the electronic device 100 for the purpose of performing the determined operation. The processor 150 may perform the determined operation by controlling the electronic device 100 in accordance with control commands.

When a specific operation is performed, the processor 150 may analyze history information showing the performing of the specific operation through the data analysis, machine learning algorithm, and methods and may update previously learned information on the basis of the analyzed information.

Accordingly, the processor 150, together with the learning processor 140, can improve the accuracy of future performance of the data analysis, machine learning algorithm and methods on the basis of the updated information.

The processor 150 generally controls the overall operations of the electronic device 100 in addition to the operations related to the application program. For example, if the state of the electronic device 100 satisfies a set condition, the processor 150 may execute or release a lock state that limits an input of a user's control command to applications.

The processor 150 may provide information or a function appropriate to a user or may process it by processing data or information which is input or output through the components described above or by executing the application program stored in the memory 130.

In addition, the processor 150 may control at least some of the components shown in FIG. 1 in order to execute the application program stored in the memory 130. Furthermore, in order to execute the application program, the processor 150 may operate at least two or more components included in the electronic device 100 in combination with each other.

The learning processor 140 may be configured to receive, classify, store, and output information to be used for data mining, data analysis, intelligent decision making, machine learning algorithms and technologies.

The learning processor 140 may one or more memory units configured to store data which is received, detected, sensed, generated, predefined or in another way output by the electronic device 100 or data which is received, detected, sensed, generated, predefined or in another way output by another component, device, electronic device or a device that communicates with the electronic device.

The learning processor 140 may include a memory integrated into or implemented in the electronic device 100. In some embodiments, the learning processor 140 may be implemented by using the memory 130.

Optionally or additionally, the learning processor 140 may be implemented by using a memory associated with the electronic device 100, such as an external memory coupled directly to the electronic device 100, or a memory maintained in a server communicating with the electronic device 100.

In another embodiment, the learning processor 140 may be implemented by using a memory maintained in a cloud computing environment or by using another remote memory location accessible by the electronic device 100 through a communication method such as a network.

The learning processor 140 may be generally configured such that data is stored in one or more databases in order that the data is identified, indexed, categorized, manipulated, stored, retrieved and output for the purpose that data is used in supervised learning, unsupervised learning, reinforcement learning, data mining, predictive analytics or in other electronic devices.

Through use of any of a variety of different types of data analysis algorithms and machine learning algorithms, the information stored by the learning processor 140 may be used by one or more other controllers of the electronic device 100 or the processor 150.

Examples of such algorithms include k-nearest neighbor system, fuzzy logic (e.g., probability theory), neural network, Boltzmann machine, vector quantization, pulse neural network, support vector machine, maximum margin classifier, hill climbing, inductive logic system Bayesian network, Petri Net (e.g., finite state machine, Mealy machine, Moore finite state machine), classifier tree (e.g., perceptron tree, support vector tree, Markov tree, decision tree forest, random forest), stake model and system, artificial fusion, sensor fusion, image fusion, reinforcement learning, augmented reality, pattern recognition, automated planning, and the like.

The learning processor 140 may store an artificial neural network (ANN) model used in the machine learning algorithm in the memory 130, generate a learning model which has trained the artificial neural network model and store the learning model in the memory 130. In addition, the learning processor 140 may perform tasks such as classification, detection, and recognition based on data input by using the learning model.

Artificial intelligence refers to the field of studying artificial intelligence or methodology for making artificial intelligence, and the machine learning refers to the field of defining various issues dealt with in the field of artificial intelligence and studying methodology for solving the various issues. The machine learning is defined as an algorithm that enhances the performance of a certain task through steady experience with the certain task.

The artificial neural network is a model used in machine learning and may mean a whole model which has a problem-solving ability and is composed of artificial neurons (nodes) that form a network by synaptic connections. The artificial neural network may be defined by a connection pattern between neurons of different layers, a learning process for updating model parameters, and an activation function for generating an output value.

Figure 2:
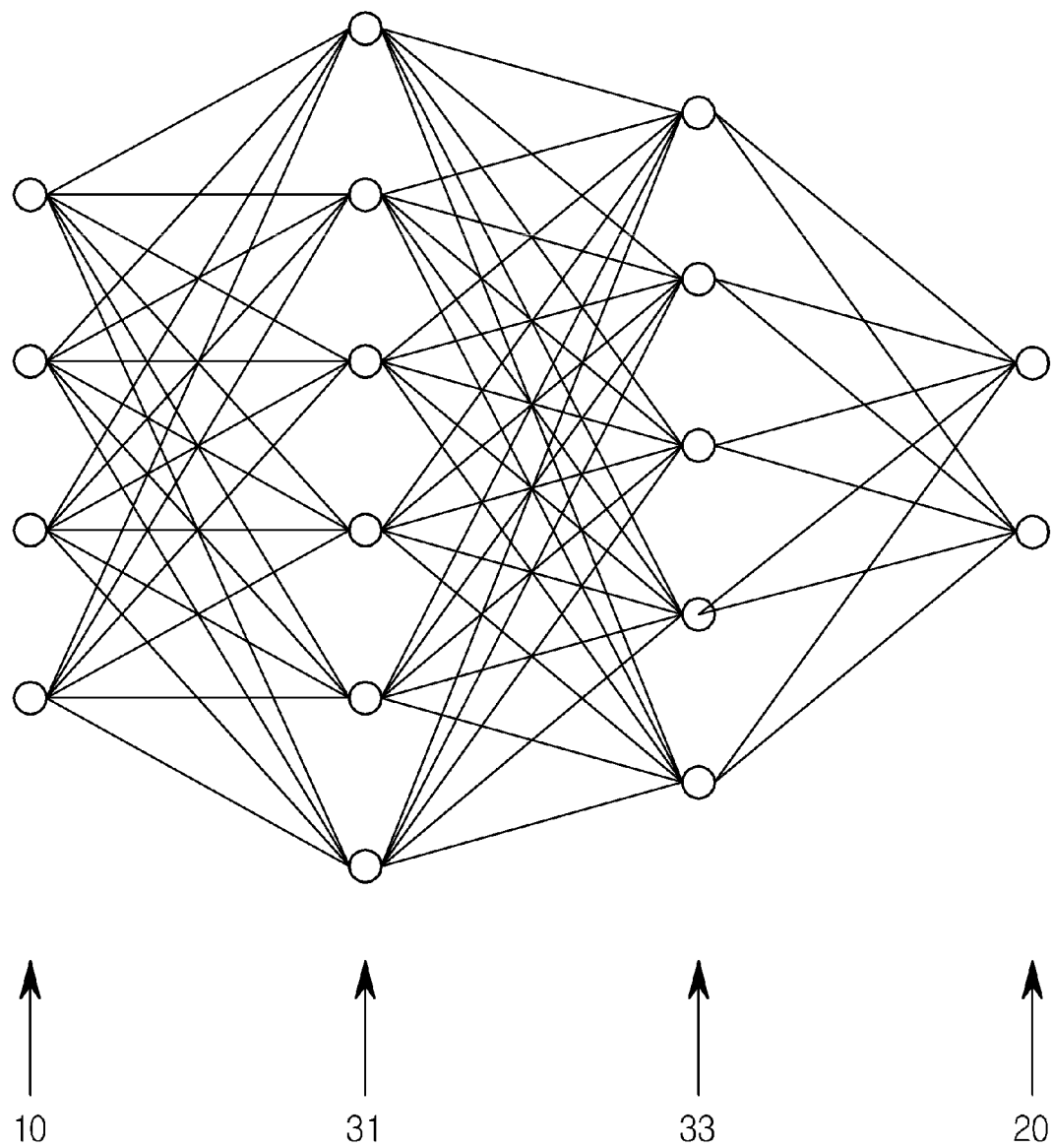
FIG. 2 is a view showing an example of a fully connected artificial neural network structure.

FIG. 2 is a view showing an example of a fully connected artificial neural network structure.

Referring to FIG. 2, the artificial neural network may include an input layer 10, an output layer 20, and optionally one or more hidden layers 31 and 32. Each layer includes one or more neurons which correspond to the neurons in the neural network, and the artificial neural network may include a synapse that links a node in one layer with a node in another layer. In the artificial neural network, a node may receive input signals input through the synapse, and generate an output value based on an activity function of a weight and a bias for each input signal. The output value of each node may act as an input signal to the next layer through the synapse. An artificial neural network in which all the nodes of one layer and all the nodes of the next layer are connected through the synapses may be referred to as a fully connected artificial neural network.

Parameters of the artificial neural network model may mean parameters determined by learning, and may include the weight of the synaptic connections and bias of neurons, etc. In addition, a hyper parameter may mean a parameter to be set before learning in the machine learning algorithm, and may include a learning rate, the number of times of the repetition, a mini batch size, an initialization function, and the like.

Machine learning, which is implemented by a deep neural network (DNN) including a plurality of hidden layers among artificial neural networks, is called deep learning, and the deep learning is part of the machine learning. Hereinafter, the machine learning may be used as meaning the deep running.

Figure 3:
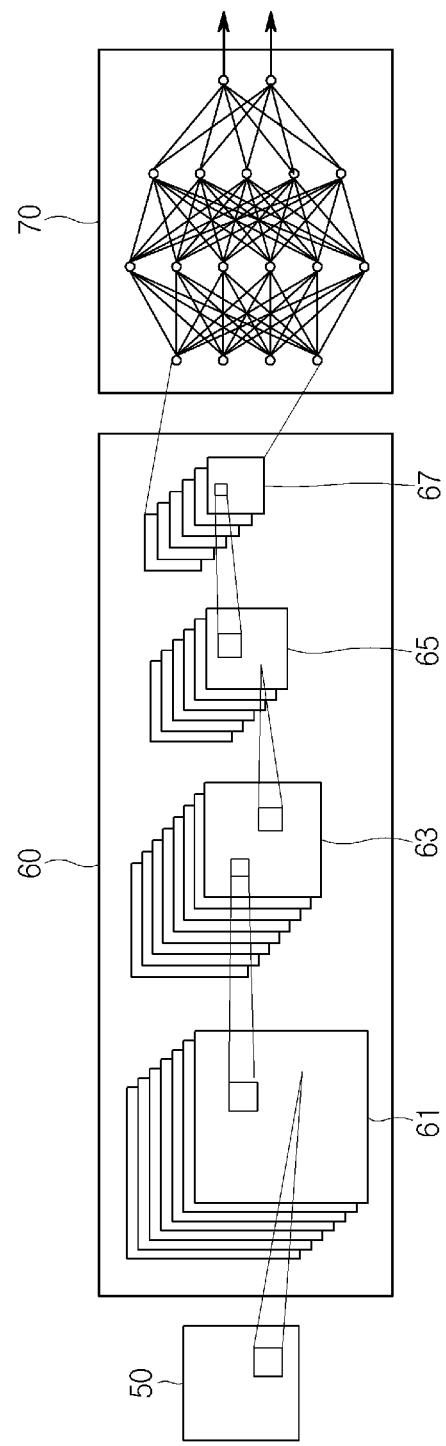
FIG. 3 is a view showing an example of a structure of a convolutional neural network (CNN), that is, a kind of a deep neural network.

FIG. 3 is a view showing an example of a structure of a convolutional neural network (CNN), that is, a kind of the deep neural network.

In the identification of structural spatial data such as images, moving pictures, and character strings, a convolutional neural network structure as shown in FIG. 3 may be more effective. The convolutional neural network can effectively recognize features associated with adjacent images while maintaining spatial information of the image.

Referring to FIG. 3, the convolutional neural network may include a feature extraction layer 60 and a classification layer 70. The feature extraction layer 60 may synthesize those located spatially close in the image by using convolution and then extract the features of the image.

The feature extraction layer 60 may be configured by stacking a plurality of convolution layers 61 and 65 and a plurality of pooling layers 63 and 67. By the convolution layers 61 and 65, the activation function may be applied after a filter is applied to input data. The convolution layers 61 and 65 may include a plurality of channels. By each of the channels, different filters and/or different activation functions may be applied. The result of the convolution layers 61 and 65 may be a feature map. The feature map may be data in the form of a two-dimensional matrix. The pooling layers 63 and 67 may receive output data of the convolution layers 61 and 65, that is, the feature map, as an input, and may be used to reduce the size of the output data or to emphasize specific data. The pooling layers 63 and 67 may generate output data by applying a max pooling function which selects the maximum value among some data of the output data of the convolution layers 61 and 65, an average pooling function which selects an average value, and a min pooling function which selects the minimum value.

The feature map which is generated through a series of the convolution layers and the pooling layers may become gradually smaller in size. A final feature map generated through the last convolution layer and the last pooling layer may be converted to have a one-dimensional form and be input to the classification layer 70. The classification layer 70 may have the fully connected artificial neural network structure shown in FIG. 2. The number of input nodes in the classification layer 70 may be equal to a number obtained by multiplying the number of elements of a matrix of the final feature map by the number of channels.

In addition to the above-described convolutional neural network, a recurrent neural network (RNN), a long short-term memory (LSTM) network, and gated recurrent units (GRU) may be also used as the deep neural network structure. The recurrent neural network can classify or predict by learning sequential data. The recurrent neural network has a recurrent structure therein, so that the learning of the past time is multiplied by a weight and is reflected in the current learning. Thus, the current output result is affected by the output result from the past time, and the hidden layer performs a kind of memory function. The recurrent neural network may be used to analyze a voice waveform and to perform a machine translation, may be used to identify front and back components of a text sentence, and to generate a text, or may be used to recognize voices.

The purpose of artificial neural network learning is regarded as determining a model parameter that minimizes a loss function. The loss function may be used as an index for determining an optimal model parameter in the learning process of the artificial neural network. In the case of a fully connected artificial neural network, the weight of each synapse may be determined by learning. In the case of the convolutional neural network, a filter of the convolution layer for extracting the feature map may be determined by learning.

The machine learning may be classified into supervised learning, unsupervised learning, and reinforcement learning on the basis of a learning method.

The supervised learning refers to a method of training the artificial neural network in a state in which a label for learning data is given. The label may mean a correct answer (or a result value) that the artificial neural network must infer when the learning data is input to the artificial neural network. The unsupervised learning may refer to a method of training the artificial neural network in a state in which a label for learning data is given. The reinforcement learning may refer to a learning method in which an agent defined in a certain environment learns to select a behavior or a behavior sequence that maximizes the cumulative reward in each state.

Figure 4:
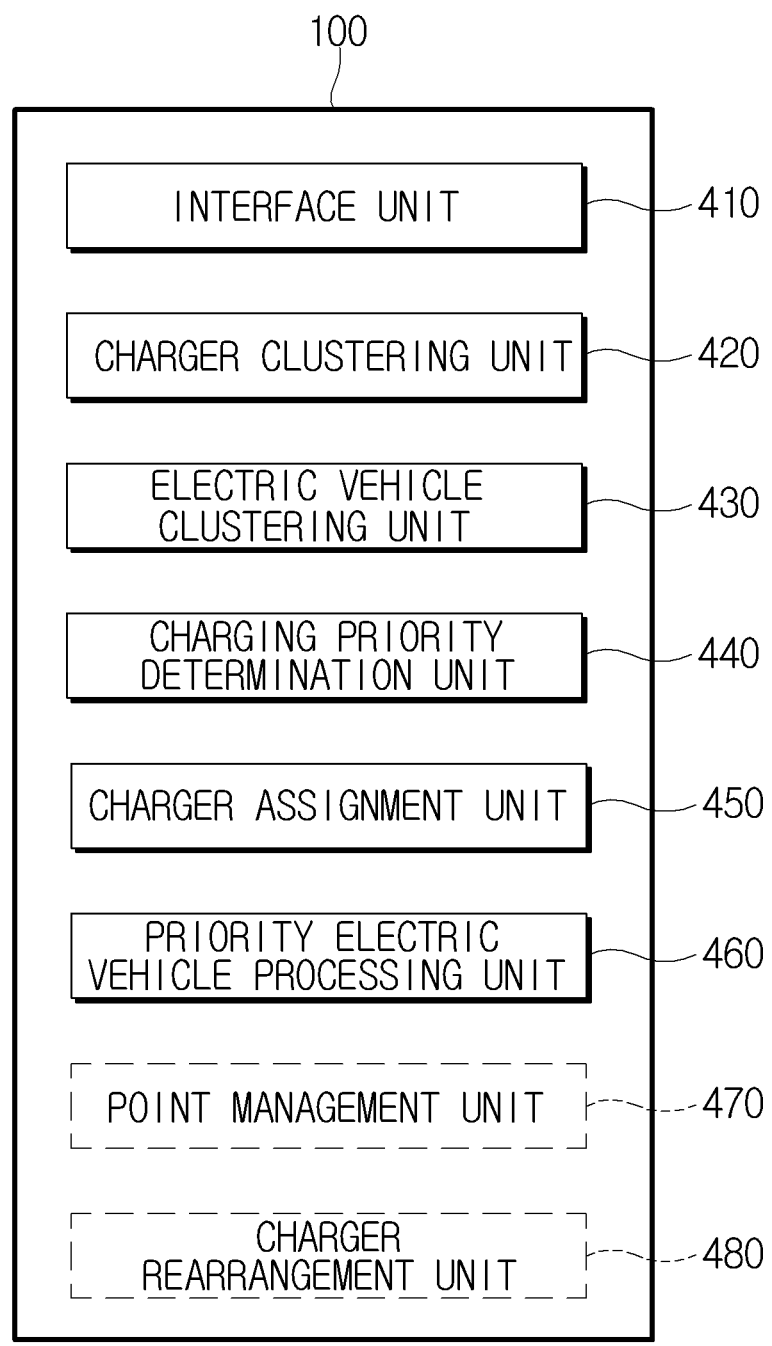
FIG. 4 is a block diagram showing components performed by at least one processor of the electronic device 100 according to various embodiments.

FIG. 4 is a block diagram showing components performed by at least one processor of the electronic device 100 according to various embodiments. The components shown in FIG. 4 may be a software program or an application module that can be executed by the processor 150 and/or the learning processor 140 of FIG. 1. Some configurations can be implemented by a separate chip, ASIC, or FPGA manufactured to perform only the corresponding configurations. In this case, the configuration may be considered as a hardware module. In addition, at least one processor may include a general-purpose processor, ASIC, FPGA, or a chip manufactured to perform a specific function or configuration. The configuration shown in FIG. 4 is only one embodiment. According to another embodiment, one component shown in FIG. 4 may be divided into several components, or several components may be combined into one component. In addition, according to further another embodiment, some of the components shown in FIG. 4 may be removed or components not shown in FIG. 4 may be added.

Referring to FIG. 4, the electronic device 100 may include an interface unit 410, a charger clustering unit 420, an electric vehicle clustering unit 430, a charging priority determination unit 440, a charger assignment unit 450, and a priority electric vehicle processing unit 460. The electronic device 100 may additionally include a point management unit 470 and a charger rearrangement unit 480.

According to various embodiments of the present disclosure, the interface unit 410 may receive, through the communication unit 110, a message requesting a charger reservation for charging an electric vehicle from at least one external electronic device (e.g., a user's smartphone) 200. In addition, the interface unit 410 may transmit and receive, through the communication unit 110, a message determining the charger reservation to and from the external electronic device 200. For example, the interface unit 410 may transmit information on a charger that can be reserved and a message requesting confirmation of the reservation to the external electronic device 200 and may receive a reservation confirmation message or a reservation rejection message from the external electronic device 200. Here, the information on a charger that can be reserved may be determined by the charger assignment unit 450. The interface unit 410 transmits, to the external electronic device 200 through the communication unit 110, a message confirming whether to yield an already reserved charger to another user having a higher priority, and may receive related response messages from the external electronic device 200. The interface unit 410 may receive a related request from the priority electric vehicle processing unit 460 and transmit a related response message.

According to various embodiments, the charger clustering unit 420 may cluster the chargers.

Figure 5:
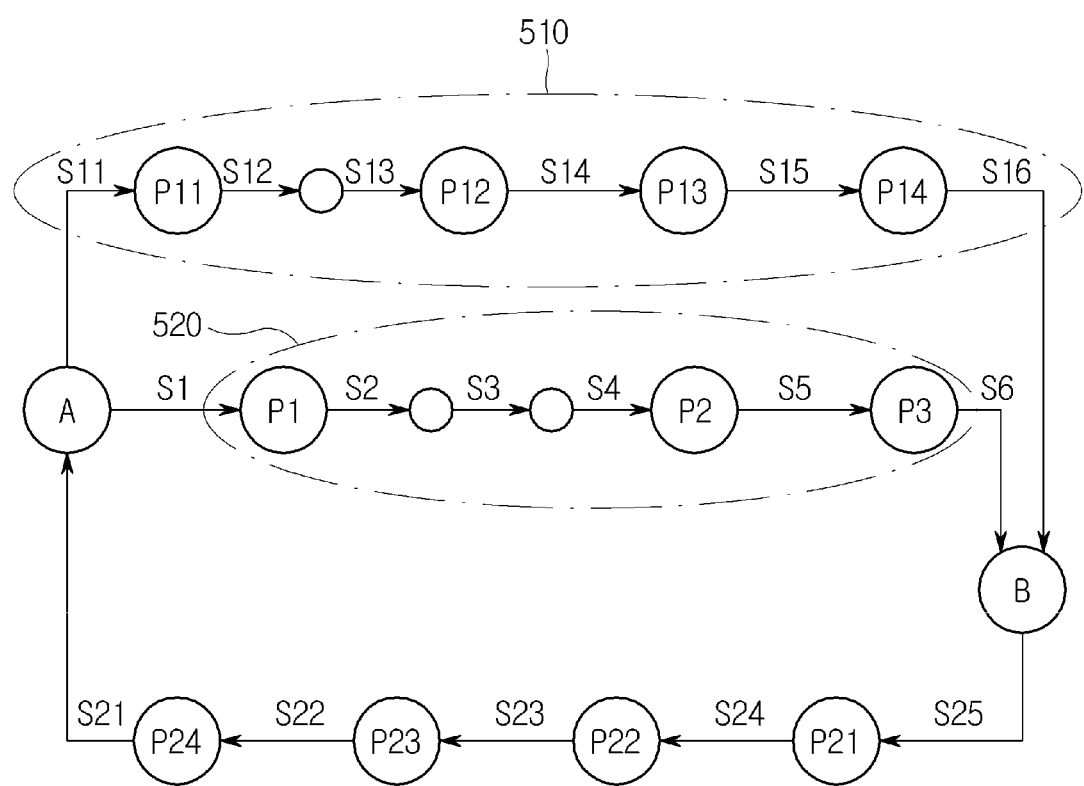
FIG. 5 is a view showing an example of clustering the chargers in accordance with various embodiments.

FIG. 5 is a view showing an example of clustering the chargers in accordance with various embodiments.

Referring to FIG. 5, a user may intend to move from a current location "A" to a destination "B" by using an electric vehicle. Accordingly, the user may inform the electronic device 100 of the current location "A" and the destination "B" of the electric vehicle. The charger clustering unit 420 of the electronic device 100 may cluster the chargers on the basis of the current location "A", the destination "B" information, and the location of the charger. Based on such clustering, the electronic device 100 may suggest at least one route to the destination "B" to the user.

According to various embodiments of the present disclosure, the electronic device 100 may cluster the chargers on the basis of a support vector machine (SVM) algorithm. The SVM algorithm is one of the machine learning algorithms and is an artificial intelligence network model for pattern recognition and data analysis. The SVM algorithm can be used for classification and regression analysis. In the present disclosure, the SVM algorithm may be used to classify and cluster the chargers between the current location "A" and the destination "B" of the electric vehicle. A classification boundary where the margin is maximized can be found by the SVM algorithm, and as a result, the thus classified chargers may be grouped into one cluster.

In the embodiment of FIG. 5, by the artificial intelligence network model for classification, the chargers P1, P2, and P3 form one cluster 520, and the chargers P11, P12, P13, and P14 form another cluster 510. According to the embodiment, one charger may be included in a plurality of clusters. According to the embodiment, a plurality of chargers may be provided in one charging station. For example, another charger P4 may be located at a location where the charger P2 is located.

According to another embodiment, the charger clustering may be performed based on the locations of the chargers regardless of the location and destination of the user. For example, in the case of a highway, chargers provided in the rest areas of one highway (e.g., all the rest areas that can be entered from Gyeongbu highway starting from the capital city or all the rest areas that can be entered from West Coast highway heading to the capital city) may be organized into one cluster. Alternatively, chargers provided in the rest areas between junctions of a highway (e.g., all the rest arears between Cheonan JC and Oksan JC) may be organized into one cluster.

According to various embodiments of the present disclosure, the electric vehicle clustering unit 430 may cluster electric vehicles that have requested a charging service at a certain predetermined time interval (for example, 5 minutes). Here, the electric vehicle clustering unit 430 may perform electric vehicle clustering for each charger cluster. For example, a user cluster 1 and a user cluster 2 may be configured for a charger cluster 1, and the user cluster 1, the user cluster 2, and a user cluster 3 may be configured for a charger cluster 2.

According to the embodiment of the present disclosure, the electric vehicle clustering unit 430 calculates a maximum travel distance of each electric vehicle on the basis of a remaining charge status of each electric vehicle requesting a charging reservation service, and, on the basis of the calculated maximum travel distance, can determine a location of the farthest place where each electric vehicle can travel. The electric vehicle clustering unit 430 may organize electric vehicles of which the locations of the farthest places where they can travel are the same as each other into one electric vehicle cluster. Here, the location may be a location of a place where the final destination or charger exists.

Figure 6:
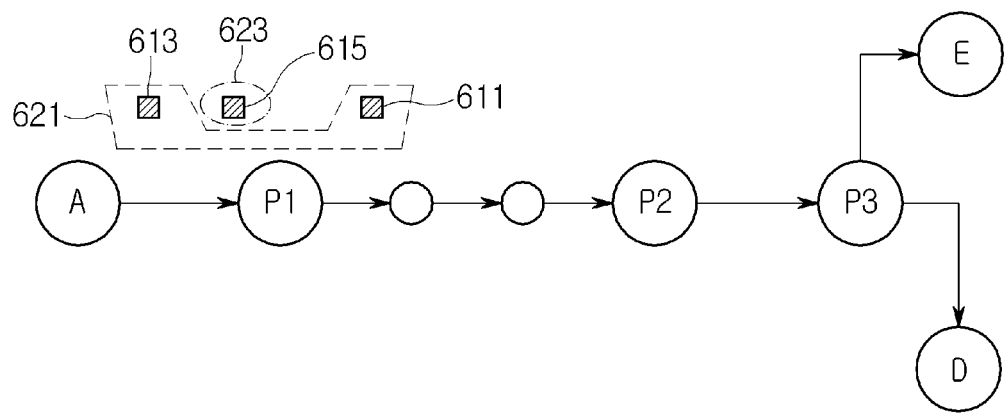
FIG. 6 is a view showing an example in which an electric vehicle clustering unit clusters the electric vehicles that have requested a charging reservation service within one charger cluster.

FIG. 6 is a view showing an example in which the electric vehicle clustering unit 430 clusters the electric vehicles that have requested a charging reservation service within one charger cluster.

Referring to FIG. 6, the electric vehicle clustering unit 430 may receive a charging reservation service request in the order of an electric vehicle 611, an electric vehicle 613, and an electric vehicle 615 through the interface unit 410. Here, each electric vehicle may provide its identification (ID), destination, and information on the remaining charge status. For example, the electric vehicle 611 may provide EV1 as its ID, D as a destination, and 60 as a remaining charge status. The electric vehicle 613 may provide EV2 as its ID, D as a destination, and 40 as a remaining charge status. The electric vehicle 615 may provide EV3 as its ID, E as a destination, and 30 as a remaining charge status.

The electric vehicle clustering unit 430 may determine, on the basis of the information received from each electric vehicle, the charger of the farthest place where each electric vehicle can travel. For example, the electric vehicle clustering unit 430 may determine the location of the farthest place where the electric vehicle EV1 611 can travel as a destination D. The electric vehicle clustering unit 430 may determine the location of the farthest place where the electric vehicle EV2 613 can travel as a destination D. In addition, the electric vehicle clustering unit 430 may determine the location of the farthest place where the electric vehicle EV3 615 can travel as P3 where the charger is located. For this determination, the electric vehicle clustering unit 430 may calculate the maximum travel distance on the basis of the information on the remaining charge status of each electric vehicle. According to the embodiment of the present disclosure, the electric vehicle clustering unit 430 may calculate the maximum travel distance in additional consideration of the type of each electric vehicle. According to another embodiment, each electric vehicle may provide maximum travel distance information calculated by itself instead of on the basis of the information on the remaining charge status. In this case, the electric vehicle clustering unit 430 can determine, on the basis of the maximum travel distance information provided by each electric vehicle, a location of the farthest place where each electric vehicle can travel. Here, the location of the farthest place where each electric vehicle can travel may be determined among the locations of the places where the chargers are provided.

Referring to the embodiment of FIG. 6, the electric vehicle clustering unit 430 may determine that the locations of the farthest places where the electric vehicle 611 and the electric vehicle 613 can travel are the same as each other, and thus, may organize the electric vehicle 611 and the electric vehicle 613 as an electric vehicle cluster 621. In addition, the electric vehicle clustering unit 430 may organize the electric vehicle 615 as another electric vehicle cluster 623 because the location of the farthest place where the electric vehicle 615 can travel is different from the locations of the farthest places where the other electric vehicles can travel.

According to various embodiments of the present disclosure, the charging priority determination unit 440 may determine a priority between the electric vehicle clusters (e.g., the electric vehicle cluster 621 and the electric vehicle cluster 623) within the charger cluster (e.g., the charger cluster 510), and may determine a priority between respective electric vehicles included within the electric vehicle cluster.

According to the embodiment, the charging priority determination unit 440 may assign a higher priority to the electric vehicle cluster in which the location of the farthest place where the electric vehicle can travel is close. Referring to the embodiment of FIG. 6, the charging priority determination unit 440 may assign a higher priority than that of the electric vehicle cluster 621 to the electric vehicle cluster 623 of which the location of the farthest place where the electric vehicle can travel is closer. In addition, the charging priority determination unit 440 may assign a higher priority to an electric vehicle which earlier makes the charging reservation service request among the electric vehicles within the electric vehicle cluster. Referring to the embodiment of FIG. 6, the charging priority determination unit 440 may assign a higher priority to the electric vehicle 611 which earlier makes the charging reservation request service among the electric vehicle 611 and the electric vehicle 613 within the electric vehicle cluster 621. Accordingly, the charging priority determination unit 440 determines the priority of the three electric vehicles which have requested the charging reservation service in the order of the electric vehicle 615, the electric vehicle 611, and the electric vehicle 613.

According to various embodiments of the present disclosure, the charger assignment unit 450 may assign a charger to the electric vehicle on the basis of the priority determined by the charging priority determination unit 440. According to the embodiment, the charger assignment unit 450 may assign each electric vehicle a charger located closest to the electric vehicle. Referring to the embodiment of FIG. 6, the charger assignment unit 450 may assign one of the chargers P1, P2, and P3 within the charger cluster to the electric vehicle 615 having the highest priority. According to the embodiment, the charger assignment unit 450 may assign the charger P1 located closest to the electric vehicle 615 among the assignable chargers P1, P2, and P3 to the electric vehicle 615. In addition, the charger assignment unit 450 may assign a charger to the electric vehicle 611 having the next priority. The electric vehicle 611 is in a position past the charger P1 and the charger P1 has been already assigned to the electric vehicle 615 having a high priority, so that the charger assignment unit 450 may recognize the charger P2 and the charger P3 as an assignable charger. Accordingly, the charger assignment unit 450 may assign the charger P2 among the assignable chargers P2 and P3 to the electric vehicle 611. In addition, the charger assignment unit 450 may finally assign a charger to the electric vehicle 613 having the lowest priority. The charger assignment unit 450 can recognize only the charger P3 as a charger which is assignable to the electric vehicle 613, so that the charger P3 is assigned to the electric vehicle 613. According to another embodiment, when there is a plurality of chargers that can be assigned to the electric vehicle 613, the charger assignment unit 450 may assign a charger closest to the electric vehicle 613 among the plurality of the assignable chargers to the electric vehicle 613.

As described above, by the operations of the electric vehicle clustering unit 430, the charging priority determination unit 440, and the charger assignment unit 450, at least one processor of the electronic device 100 may assign a charger to each electric vehicle that has requested the charger reservation service and may make a reservation for charging the electric vehicle corresponding to the assigned charger. Each electric vehicle may proceed to the reserved charger to perform the charging of the electric vehicle.

According to various embodiments of the present disclosure, each electric vehicle may be in a "reservation waiting" state or in a "reservation determination" state. When, by the above-described operations of the charging priority determination unit 440 and the charger assignment unit 450, a charger is assigned to the electric vehicle which has requested the charger reservation service and when the electronic device receives an acceptance signal for the use of the assigned charger from the corresponding electric vehicle, the electronic device 100 may set the reservation of the electric vehicle to the "reservation waiting" state. In addition, when the charger set as the "reservation waiting" state based on the current location of the electric vehicle is the last available charger, the electronic device 100 may change the state of the electric vehicle from the "reservation waiting" state to the "reservation determination" state. The electric vehicle in the "waiting for reservation" state can "yield" the charger assigned to itself to another electric vehicle. However, the electric vehicle in the "reservation determination" state cannot "yield" the charger assigned to itself to another electric vehicle.

According to various embodiments of the present disclosure, when an electric vehicle having a higher priority requests a charging reservation, a charger already assigned to another electric vehicle may be yielded to the electric vehicle having a higher priority.

Figure 7:
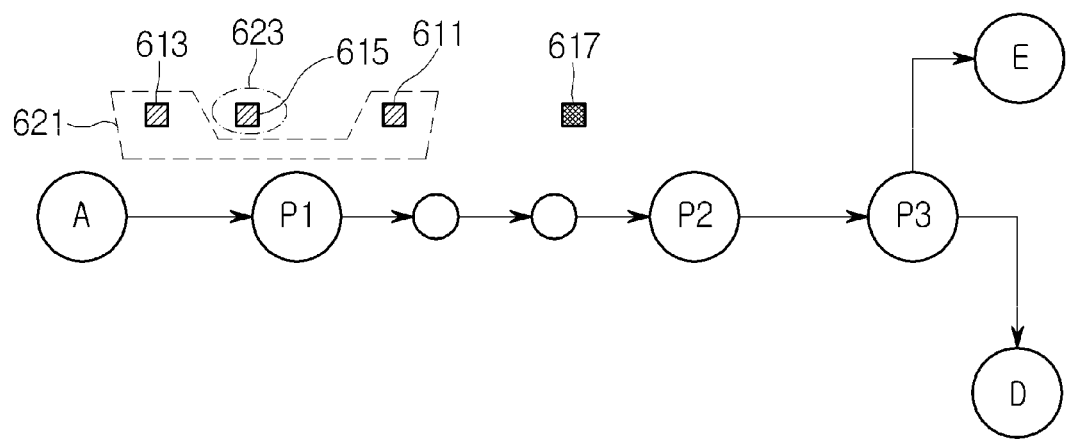
FIG. 7 is a view showing an embodiment in which an electric vehicle having a higher priority requests a charging reservation after the chargers are reserved in the electric vehicles.

FIG. 7 is a view showing an embodiment in which an electric vehicle having a higher priority requests the charging reservation after the chargers are reserved in the electric vehicles.

In FIG. 7, the electric vehicles 611, 613, and 615 may be making a reservation for charging in the chargers P1, P2, and P3 in accordance with the above-described embodiment of FIG. 6. In addition, the electric vehicles 611, 613, and 615 may be in the "reservation waiting" state. In this situation, an electric vehicle 617 may request a charging reservation. For example, the electric vehicle 617 may request a charging reservation while providing EV4 as an ID, D as a destination, and 10 as a remaining charge status. The electric vehicle clustering unit 430 may determine, on the basis of the information received from the electric vehicle 617, the location of the farthest place where the electric vehicle 617 can travel as P2. Since the charging priority determination unit 440 may provide a higher priority to the electric vehicle in which the location of the farthest place where the electric vehicle can travel is the closest, the charging priority determination unit 440 may give the highest priority to the electric vehicle 617. Accordingly, the charger assignment unit 450 intends to assign the charger P2 to the electric vehicle 617. However, all of the assignable chargers may have been already reserved in another electric vehicle. For example, the charger P2 may have been already reserved in the electric vehicle 611. In this case, at least one processor 150 of the electronic device 100 may execute the priority electric vehicle processing unit 460.

In order to assign a charger to the electric vehicle 617 having the highest priority, the priority electric vehicle processing unit 460 may transmit a yielding recommendation notification to the electric vehicles (e.g., electric vehicle 611) which have reserved in advance the chargers (for example, charger P2) assignable to the electric vehicle 617.

According to the embodiment of the present disclosure, when there is an electric vehicle that accepts the yielding in response to the yielding recommendation notification, the priority electric vehicle processing unit 460 may give a reward (for example, 500 points) to an electric vehicle that accepts earliest the yielding and may assign a reservation right to the electric vehicle 617. In this case, the electric vehicle 617 may pay an additional cost for preferential use.

According to another embodiment, when there is no electric vehicle accepting the yielding, the priority electric vehicle processing unit 460 may make a reservation for the closest charger (e.g., charger P2) among the chargers that can be assigned to the electric vehicle 617, in such a way as to be next to an electric vehicle which has reserved earlier. The electric vehicle 617 may go to the corresponding charger and wait until the electric vehicle which has reserved earlier completes charging, and then charge. According to another embodiment, when there is no electric vehicle accepting the yielding, the priority electric vehicle processing unit 460 may make a reservation for a charger determined to have the shortest waiting time among the chargers that can be assigned to the electric vehicle 617 in such a way as to be next to an electric vehicle which has reserved earlier. The electric vehicle 617 may go to the corresponding charger and wait until the electric vehicle which has reserved earlier completes charging, and then charge.

The priority electric vehicle processing unit 460 may make a separate reservation for an electric vehicle (e.g., the electric vehicle 611) that has accepted the yielding. According to the embodiment of the present disclosure, for the electric vehicle 611 that has accepted the yielding, the priority electric vehicle processing unit 460 may make a reservation for the charger (e.g., the charger P2) set originally as the "reservation waiting" state, in such a way as to have the second priority of the charger. Since the high priority electric vehicle (for example, the electric vehicle 617) which has been yielded has the first priority for the charger P2, the priority electric vehicle processing unit 460 may make a reservation for the charger in such a way as to have the next priority (second priority). According to another embodiment, the priority electric vehicle processing unit 460 may assign one of the chargers before the location of the farthest place where each electric vehicle 611 that has accepted the yielding can travel. In this case, a reservation for a charger which has been not reserved can be made to have the first priority. If all the chargers are reserved, a charger that is determined to have the shortest waiting time can be reserved. According to another embodiment of the present disclosure, the priority electric vehicle processing unit 460 may provide location information of a charger which can be reserved and chargeable time information to the electric vehicle 611 that has accepted the yielding, thereby allowing the user to select the charger. According to another embodiment of the present disclosure, the priority electric vehicle processing unit 460 determines that the electric vehicle 611 that has accepted the yielding requests a new charging, and then may make a new reservation for a charger on the basis of the method shown in FIG. 6. In this case, the highest priority may be given to the electric vehicle 611 that has accepted the yielding.

According to various embodiments of the present disclosure, the electronic device 100 may give rewards and penalties for a user through the point management unit 470. An electric vehicle or a user of the electric vehicle that wants to use the charger reservation service must register with a member, and the registered member can add or subtract points with rewards and penalties.

Figure 8:
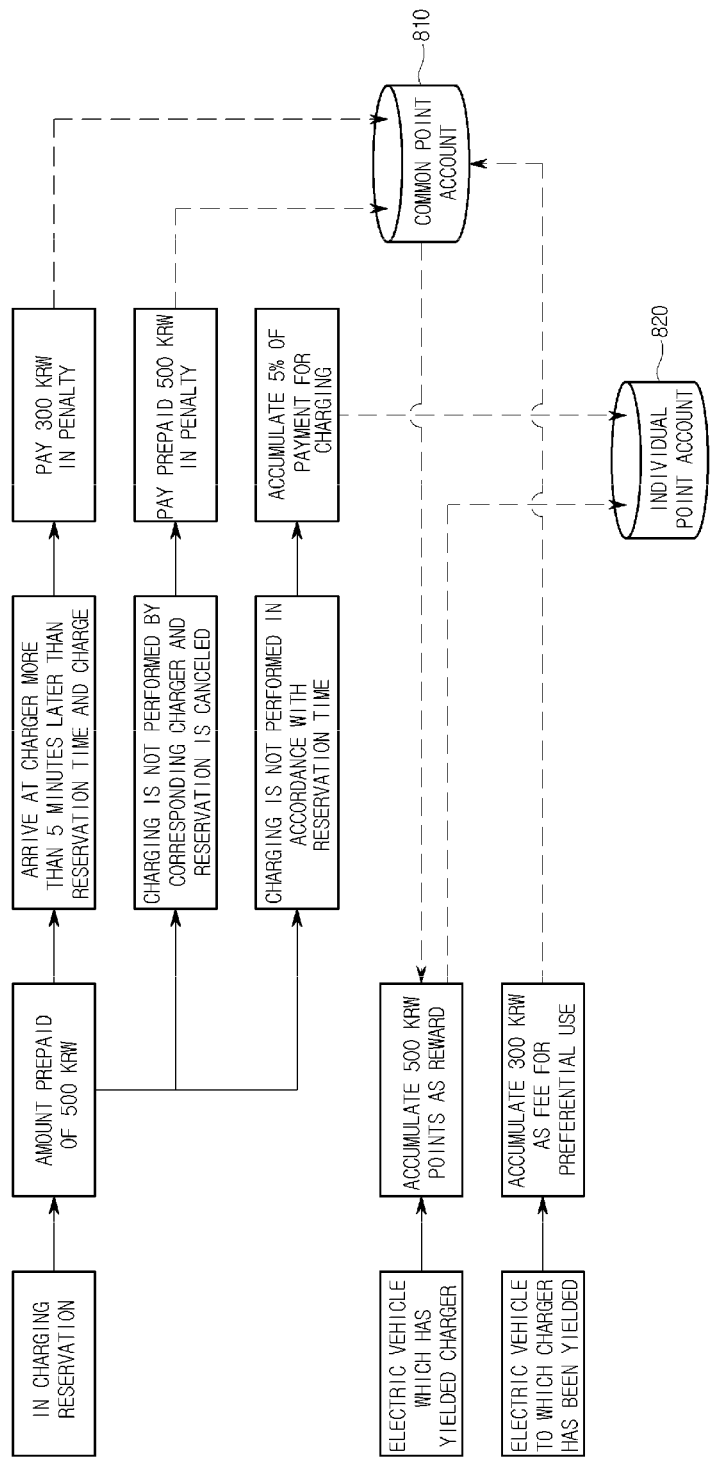
FIG. 8 is a view showing an example of a point management method of a point management unit according to various embodiments.

FIG. 8 is a view showing an example of a point management method of a point management unit according to various embodiments.

Referring to FIG. 8, the point management unit 470 may manage a common point account 810 and an individual point account 820.

When the user reserves the charging and the charging is performed according to the reservation time, the point management unit 470 may accumulate a portion (e.g., 5%) of a charging fare in the individual point account 820 of the user. In addition, the point management unit 470 may accumulate a certain amount (for example, 500 KRW) in the individual point account 820 of the user as a reward for the user who has yielded the already reserved charger to the electric vehicle having a high priority. The user can pay a certain amount accumulated in the individual point account 820 in penalties or can use the amount accumulated in the individual point account 820 for charging the electric vehicle.

When the user who has reserved the charging arrives at the charger a predetermined period of time (e.g., 5 minutes) later than a reservation time and charges, the point management unit 470 may receive a predetermined amount (e.g., 300 KRW) as a penalty from the user and may accumulate it in the common point account 810. In addition, when the user who has reserved the charging does not charge within a predetermined period of time (e.g., 10 minutes) by the corresponding charger and the reservation is canceled, the point management unit 470 may not return an amount prepaid (e.g., 500 KRW) at the time of reservation to the user and may accumulate it in the common point account 810 as a penalty. In addition, the point management unit 470 may receive a predetermined amount (e.g., 300 KRW) as a fee for preferential use from the electric vehicle to which the charger has been yielded and may accumulate it in the common point account 810. The point management unit 470 may provide reward points for an electric vehicle user who has yielded a charger from the amount accumulated in the common point account 810.

According to various embodiments of the present disclosure, the charger rearrangement unit 480 may accumulate the use state and determine the number of chargers to be disposed in each electric vehicle charging station on the basis of the accumulated use state and recommend it to business operators. According to the embodiment, the charger rearrangement unit 480 may determine a charger rearrangement recommendation by using an expectation-maximization (EM) algorithm. The expectation maximization algorithm may mean an iterative algorithm that finds an estimated value of a parameter having maximum likelihood or maximum a posteriori in a probability model that depends on an unobserved latent variable. The expectation maximization algorithm applies alternately an expectation process of calculating the expectation of log likelihood as the estimate of the parameter and a maximization process of obtaining the parameter estimates that maximize the expectation. A variable value calculated during the maximization process can be used as an estimate for the next expectation process.

Figure 9:
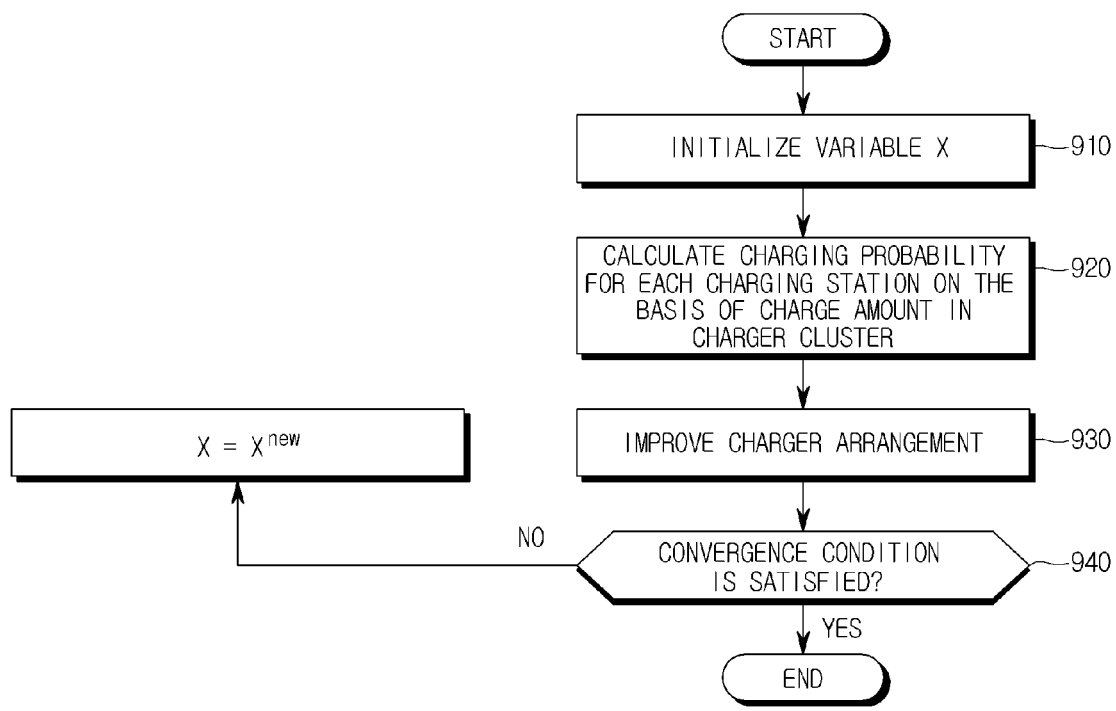
FIG. 9 is a flowchart showing a charger arrangement improvement operation to which an expectation-maximization algorithm of a charger rearrangement unit is applied.

FIG. 9 is a flowchart showing a charger arrangement improvement operation to which an expectation-maximization algorithm of a charger rearrangement unit is applied.

Referring to FIG. 9, the charger rearrangement unit 480 may apply the above-described expectation maximization algorithm to produce a charger arrangement improvement.

In step 910, the charger rearrangement unit 480 may set a variable X representing a charge amount charged by the chargers in the charger cluster. According to the embodiment, the variable X may be a daily average value of the accumulated charge amount charged by the chargers in the cluster.

In step 920, the charger rearrangement unit 480 may calculate a charging probability for each charging station on the basis of the charge amount in the charger cluster. Here, the charging station indicates a place where the charger is located, and there may be a plurality of chargers in one charging station.

In step 930, the charger rearrangement unit 480 may produce charger arrangement capable of maximizing the charge amount that can be charged by the chargers in the charger cluster on the basis of the charging probability for each charging station calculated in step 920.

In step 940, the charger rearrangement unit 480 may determine whether a convergence condition is satisfied. According to the embodiment of the present disclosure, it can be determined that the convergence condition is satisfied if the charge amount that can be obtained by the charger arrangement according to the result of step 930 is greater than the daily average of the current cumulative charge amount of the corresponding charger cluster. When the convergence condition is satisfied, the charger rearrangement unit 480 may terminate the step. When the convergence condition is not satisfied, the charger rearrangement unit 480 may perform step 920 by using the charge amount derived from the result of step 930 as a new input variable.

The charger rearrangement unit 480 may derive the optimal charger arrangement improvement by performing the expectation calculation 920 and the charger arrangement improvement 930 for maximizing the charge amount until the convergence condition is satisfied.

According to various embodiments of the present disclosure, each functional block performed by at least one processor in order to provide the above-described charger reservation service of the electronic device 100 may operate based on Stanford research institute problem solver (STRIPS).

Figure 10:
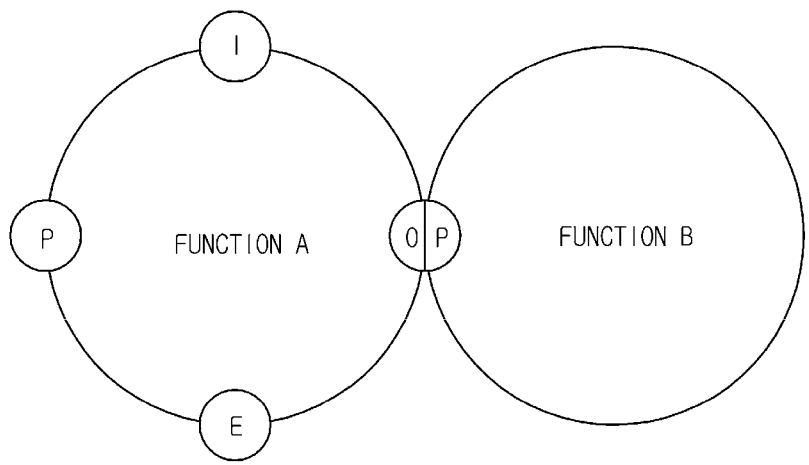
FIG. 10 is a view showing STRIPS configuration.

FIG. 10 is a view showing STRIPS configuration.

Referring to FIG. 10, the STRIPS finds a set of processes for producing outputs O on the basis of inputs I and pre-conditions P by first-order logic-based logic expressions and operates in accordance with the found processes. When reaching the output, an operation described in effect E may be performed. According to the embodiment, when a plurality of functional blocks are connected in-series, a target state O of the front end may operate as the precondition P of the rear end.

According to the embodiment, the pre-condition P, input I, output O and effects E to be used to implement the functional blocks shown in FIG. 4 by the STRIPS is defined as shown in Table 1 below. However, the present invention is not limited to this and may vary depending on applications or the functional subdivision.

with the charging reservation service application executed in the user terminal or the electric vehicle.

FIGS. 11 to 16 show examples of screens displayed on a user terminal 200*a* while the user terminal 200*a* and the electronic device 100 perform the charging reservation service.

Figure 11:
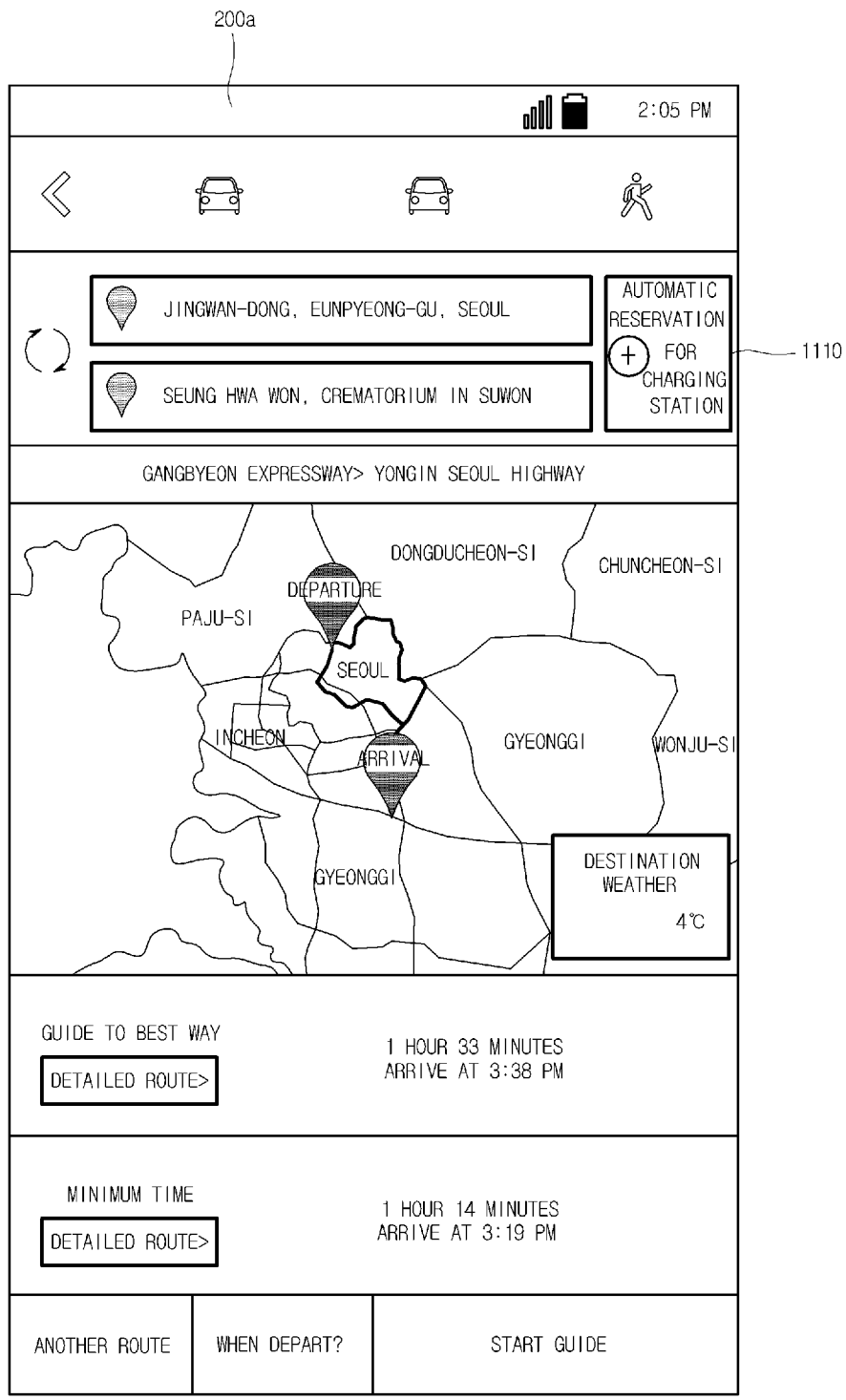
FIG. 11 is a view showing an example of requesting a charger reservation service in a user terminal.

FIG. 11 is a view showing an example of requesting the charger reservation service in a user terminal 200*a*.

Referring to FIG. 11, the charger reservation service of the user terminal 200*a* that is an external electronic device may operate in conjunction with a map application or a navigation application.

According to the embodiment of the present disclosure, a user of the user terminal 200*a* can find a route by inputting a desired destination by using a navigation application. The charger reservation service can be requested by pressing a tab 1110 requesting the charger reservation service located in a specific area of the screen. The charger reservation service application of the external electronic device may transmit the ID (e.g., EV1), the destination (e.g., Seung Hwa Won, crematorium in Suwon), and the charge state information of the user's electric vehicle to the electronic device 100 on the basis of the user's pressing the tap 1110. Here, the charger reservation service application may be aware of the charge state information in advance in conjunction with the electric vehicle.

TABLE 1

| Functional Block | Pre-Condition | Input | Output | Effect |
|---|---|---|---|---|
| Charger Clustering Unit | No cluster exists or congestion occurs or new charger is installed | Charger GPS | Charger clusters | |
| Electric Vehicle Clustering Unit | Perform at 5-minute intervals and request list | Charger clusters in the request list | The location of the farthest place where each electric vehicle can travel, electric vehicle clusters | Call the charging priority determination unit |
| Charging Priority Determination Unit | Call the charging priority determination unit | Electric vehicle clusters | List of priorities of respective electric vehicles | Call the charger assignment unit |
| Charger Assignment Unit | Call the charger assignment unit | List of priorities of respective electric vehicles | List of chargers assigned to respective electric vehicles | |
| Priority Electric Vehicle Processing Unit | High priority customer request list | List of electric vehicles that have yielded | Reservation notification list | Call the point management unit |
| Point Management Unit | Call point management unit or when customer reservation is accepted or when a member prepays a charging fare | Member IDs | | Point DB update |
| Interface Unit | A predetermined time interval, notification provided | List of chargers assigned to respective electric vehicles | Customer response list | Call a payment module when an acceptance list exists. |

In response to the charger reservation service of the electronic device 100, an application for receiving a charging reservation service in a user terminal corresponding to the external electronic device 200 or in an electric vehicle may be executed. The interface unit 410 of the electronic device 100 may provide the charging reservation service to the user or the electric vehicle while exchanging information FIG. 12 is a view showing an example of requesting the charger reservation service in an electric vehicle 200*b*.

Figure 12:
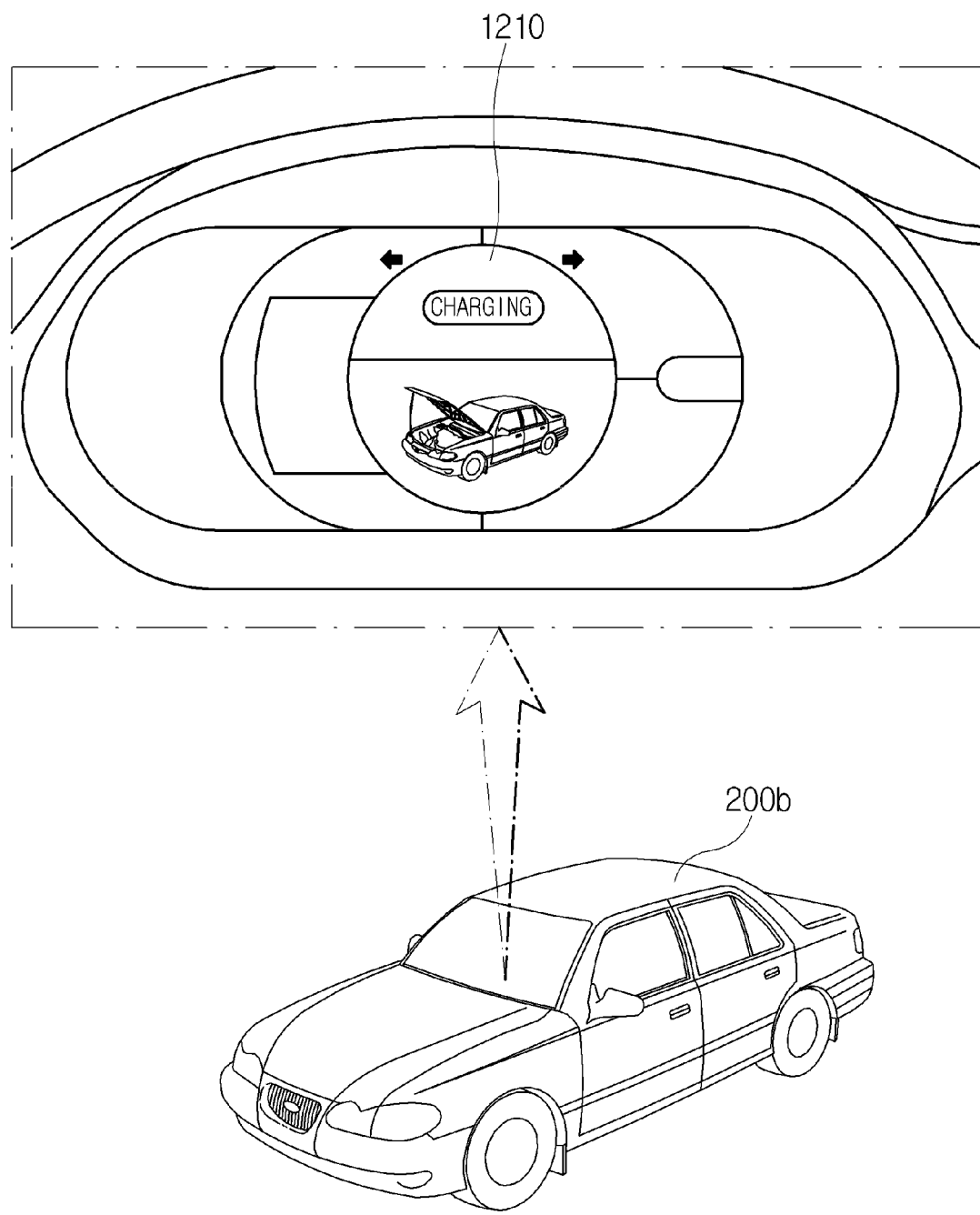
FIG. 12 is a view showing an example of requesting the charger reservation service in the electric vehicle.

Referring to FIG. 12, the charger reservation service application may be provided in the electric vehicle that is an external electronic device.

According to the embodiment of the present disclosure, a driver may request the charger reservation service by pressing a "charge" tab 1210 displayed on the LCD in front of the driver's seat. Alternatively, the charger reservation service may be requested by operating a switch which is separately provided in the electric vehicle and is set for charger reservation. The charger reservation service application of the electric vehicle 200b may transmit the ID (e.g., EV4), the destination (e.g., Seung Hwa Won, crematorium in Suwon), and the charge state information of the electric vehicle 200 to the electronic device 100 on the basis of the user's pressing the tap 1210. Here, the destination information may be information input by the user to the navigation system provided in the electric vehicle 200b.

Figure 13:
FIG. 13 is a view showing an example of a screen notifying the user that a reservation request of the user has been received.

FIG. 13 is a view showing an example of a screen notifying the user that a reservation request of the user has been received.

The interface unit 410 of the electronic device 100 may transmit a reception response message to the user terminal or the electric vehicle in response to a charger reservation request from the user terminal or the electric vehicle. According to the embodiment, when the user terminal 200a receives a reception response from the interface unit 410 of the electronic device 100, the user terminal 200a may give a notification to the user by using a pop-up message shown in FIG. 13.

Figure 14:
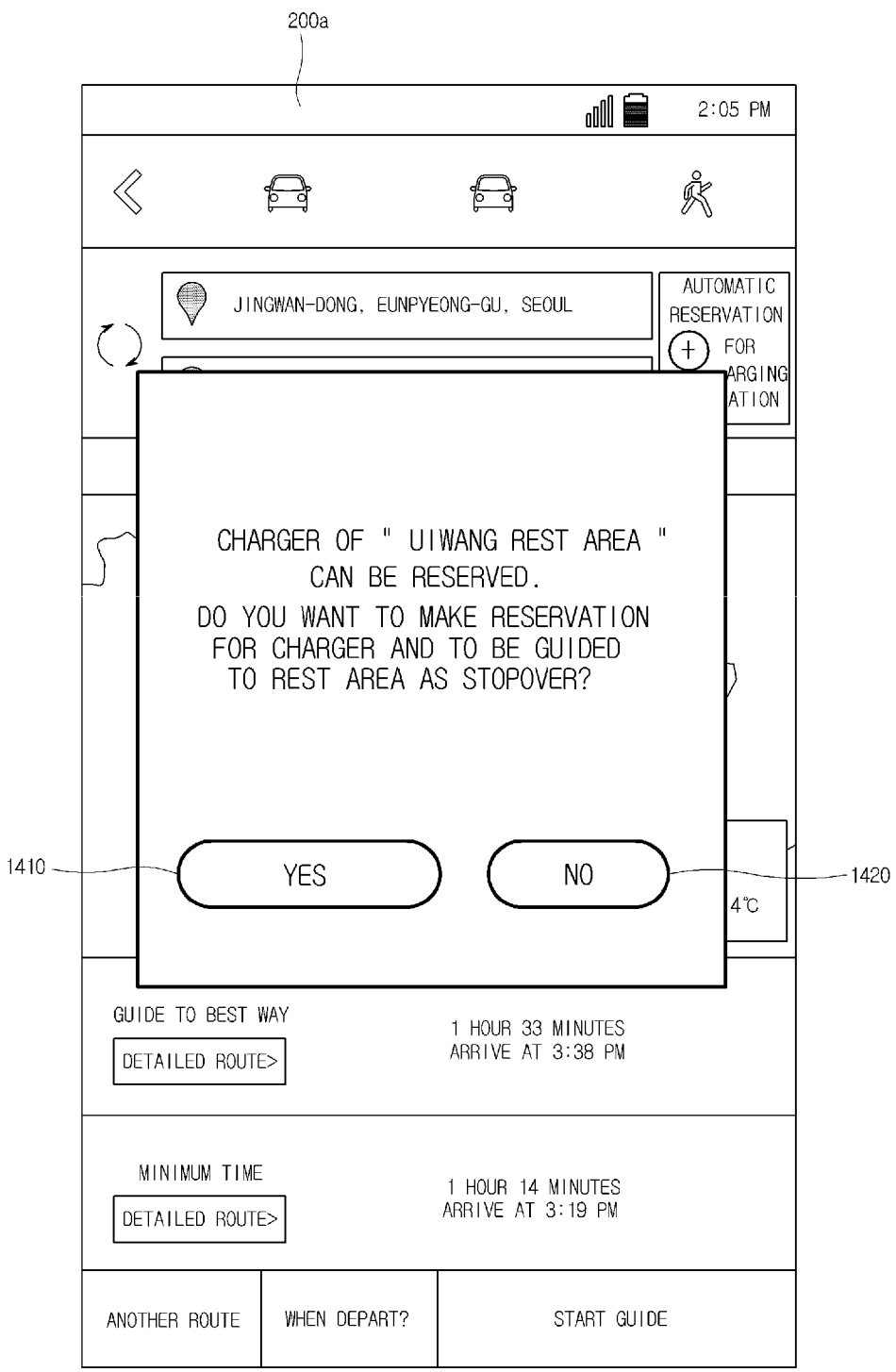
FIG. 14 is a view showing an example of displaying a message requesting user approval for charger assignment on the user terminal.

FIG. 14 is a view showing an example of displaying a message requesting user approval for charger assignment on the user terminal 200a.

When a charger is assigned to a user who has requested a reservation by the charger assignment unit 450, the interface unit 410 of the electronic device 100 may transmit information on the assigned charger to the user terminal 200a. An application in the user terminal 200a may request approval while displaying the received charger information on the screen. In the embodiment of FIG. 14, the user can accept by pressing a "Yes" tab 1410 or reject by pressing a "No" tab 1420.

Figure 15:
FIG. 15 is a view showing an example of a screen displayed on the user terminal when the user approves the assigned charger.
Figure 16:
FIG. 16 is a view showing an example of a screen displayed on the user terminal when the user rejects the assigned charger.

FIG. 15 is a view showing an example of a screen displayed on the user terminal 200a when the user approves the assigned charger. FIG. 16 is a view showing an example of a screen displayed on the user terminal 200a when the user rejects the assigned charger.

When the user approves the assigned charger by pressing the "Yes" tab 1410 in response to the approval request of FIG. 14, the user terminal 200a transmits information that the user has accepted to the electronic device 100, and the interface unit 410 which has received the acceptance information may transmit notification information according to the acceptance to the user terminal. The user terminal 200a may display a message shown in FIG. 15 in the form of a pop-up message on the basis of the received notification information.

When the user rejects the assigned charger by pressing the "No" tab 1420 in response to the approval request of FIG. 14, the user terminal 200a transmits information that the user has rejected to the electronic device 100, and the interface unit 410 which has received the rejection information may transmit notification information according to the rejection to the user terminal. The user terminal 200a may display a message shown in FIG. 15 in the form of a pop-up message on the basis of the received notification information.

According to various embodiments of the present disclosure, the electronic device (e.g., the electronic device of FIG. 1) may include a communication device (e.g., the communication unit 110 of FIG. 1) configured to receive charging reservation requests from electric vehicles, a memory (e.g., the memory 130 of FIG. 1) configured to store data and programs required for operation, and at least one processor (e.g., the processor 150 and the learning processor 140 of FIG. 1) configured to operatively connect to the communication device and the memory.

According to various embodiments of the present disclosure, the at least one processor may be configured to perform operations including clustering chargers into at least one charger cluster and storing the at least one charger cluster in the memory, receiving the charging reservation requests from the electric vehicles through the communication device during a predetermined period of time, clustering, based on the received charging reservation requests, the electric vehicles into at least one electric vehicle cluster, determining, based on the at least one electric vehicle cluster, a charging priority between the electric vehicles and assigning, based on the determined charging priority, the chargers to the electric vehicles.

According to various embodiments of the present disclosure, the at least one processor may be further configured to perform operation of receiving confirmations whether to reserve the assigned charger from the electric vehicles.

According to various embodiments, the clustering of the chargers into at least one charger cluster may comprise clustering the chargers based on locations of the chargers.

According to various embodiments of the present disclosure, the clustering of the chargers into at least one charger cluster may comprise clustering the chargers based on performing a Support Vector Machine (SVM) algorithm on locations of the chargers and routes of the electric vehicles moving to the chargers.

According to various embodiments of the present disclosure, the clustering of the chargers into at least one charger cluster is initiated based on a determination that no charger cluster corresponds to locations of the electric vehicles associated with the charging reservation requests, a determination of congestion on a road on which the electric vehicles are driving or a determination that a new charger has been installed.

According to various embodiments of the present disclosure, the at least one processor may be further configured to perform operations including obtaining information of the electric vehicles that have sent the charging reservation request, determining, based on the obtained information of the electric vehicles, a location of a farthest charger to which each of the electric vehicles is able to travel and clustering the electric vehicles into the at least one electric vehicle cluster based on the determination of the farthest charger to which each of the electric vehicles is able to travel.

According to various embodiments of the present disclosure, the at least one processor may be further configured to perform operations including determining a first electric vehicle with a high charging priority based on the location of the farthest charger to which the first electric vehicle is able to travel being closer than that of other electric vehicles and determining a second electric vehicle with a high charging priority based on a determination that the second electric vehicle made an earliest charging reservation request among the electric vehicles.

According to various embodiments of the present disclosure, the at least one processor may be further configured to perform operations including assigning a charger to the second electric vehicle having the high charging priority and assigning a closest charger to the first corresponding electric vehicle among the chargers of the at least one charger cluster.

According to various embodiments of the present disclosure, the at least one processor may obtain an urgent charging reservation request and may preferentially assign a charger to an electric vehicle that has made the urgent charging reservation request in response to the urgent charging reservation request.

According to various embodiments of the present disclosure, the at least one processor may receive the urgent charging reservation request from the user through the communication unit or may determine whether the received charging reservation request is the urgent charging reservation request on the basis of information on the received charging reservation request and then may obtain the urgent charging reservation request.

According to various embodiments of the present disclosure, the at least one processor may obtain information on the charger assignable to the electric vehicle which has made the urgent charging reservation request, and may transmit, through the communication unit, the yielding recommendation notification to persons who have reserved in advance the assignable chargers. The at least one processor may determine whether to receive a yielding acceptance message. If the yielding acceptance message is received as a result of the determination, the at least one processor may assign the charger reserved by the electric vehicle which has transmitted the yielding acceptance message to the electric vehicle which has made the urgent charging reservation request. If no yielding acceptance message is received as a result of the determination, the at least one processor may assign one of the assignable chargers to the electric vehicle which has made the urgent charging reservation request.

According to various embodiments of the present disclosure, when, as a result of the determination, the yielding acceptance message is received, the at least one processor may assign a charger for the electric vehicle which has transmitted the yielding acceptance message.

According to various embodiments of the present disclosure, the memory may include information on the common point account and information on the individual point account for each user, and the at least one processor may manage points that can be given to the user as rewards and penalties.

According to various embodiments of the present disclosure, when a charger is yielded to the electric vehicle which has made the urgent charging reservation request, the at least one processor may accumulate a predetermined amount as a fee for preferential use in the common point account and may accumulate a predetermined amount as a reward in in the individual point account of the user of the electric vehicle which has transmitted the yielding acceptance message. When the user who has reserved the charger performs charging according to a reservation time, the at least one processor may accumulate a portion of a charging fare in the individual point account of the user. When the user who has reserved the charger arrives at the charger more than a first predetermined time later than the reservation time and charges, the at least one processor may accumulate a predetermined amount as a penalty in the common point account. When the user who has reserved the charger does not charge by the corresponding charger and the reservation is canceled due to the lapse of a second predetermined time, the at least one processor may accumulate the prepaid amount in the common point account.

According to various embodiments of the present disclosure, the at least one processor may be configured to perform the operations based on a Stanford Research Institute Problem Solver (STRIPS).

According to various embodiments of the present disclosure, the at least one processor may be further configured to provide a charger arrangement improvement by performing an expectation-maximization algorithm based on charger assignments accumulated previously.

Figure 17:
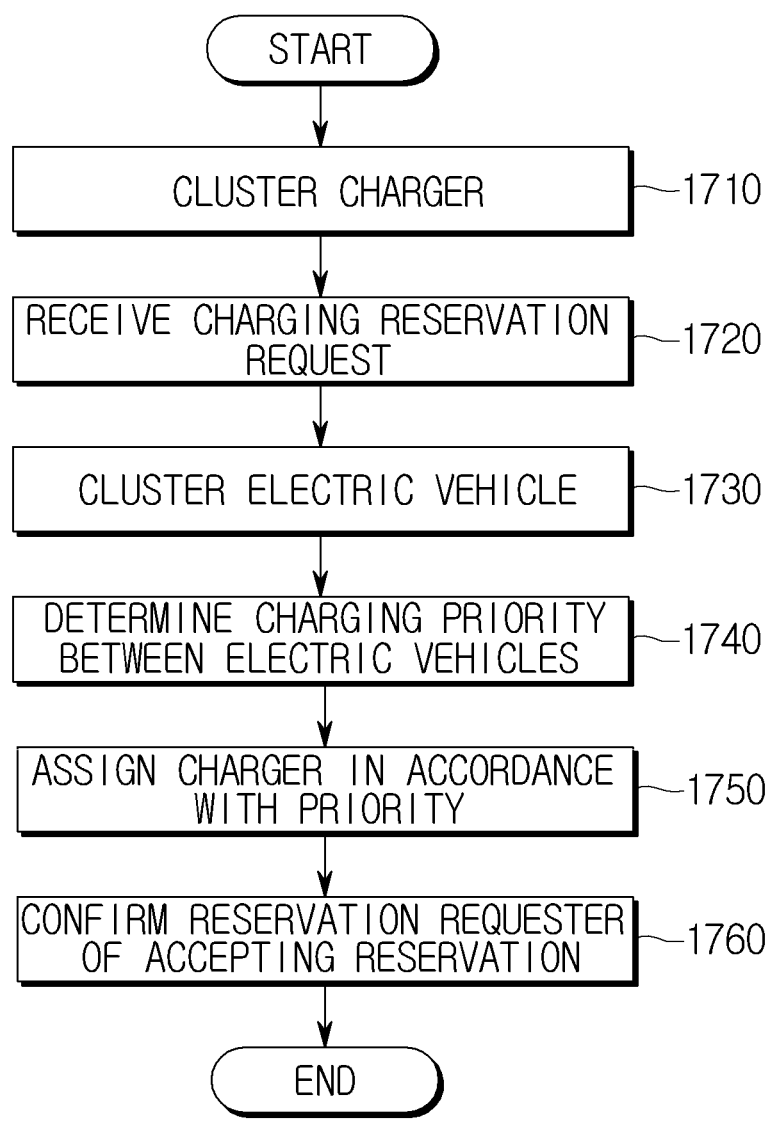
FIG. 17 is a flowchart showing an operation in which the electronic device 100 reserves the charger for the user in accordance with various embodiments.

FIG. 17 is a flowchart showing an operation in which the electronic device 100 reserves the charger for the user in accordance with various embodiments. Steps according to the flowchart shown in FIG. 17 can be implemented by the electronic device (e.g., the electronic device 100) or at least one processor of the electronic device (e.g., the processor 150 or the learning processor 140 of FIG. 1).

Referring to FIG. 17, in step 1710, the electronic device 100 may generate a plurality of the charger clusters by performing the charger clustering. The charger cluster includes a plurality of chargers, and a charger reservation method proposed in the present invention can be applied to users within one charger cluster. According to the embodiment, the charger clustering may be performed based on the locations of chargers. According to another embodiment, the electronic device 100 may perform the charger clustering on the basis of the SVM algorithm.

The electronic device 100 can perform the charger clustering when there is no charger cluster, when congestion occurs, and when a new charger is installed. For example, when a user requests the reservation service and there is no charger cluster including a location requested by the user, the electronic device 100 can perform the charger clustering. In addition, the charger clustering may be newly performed even when the road environment is rapidly changed, such as occurrence of congestion.

In step 1720, the electronic device 100 may receive a charging reservation request from the user. According to the embodiment of the present disclosure, the electronic device 100 may collect and process user charging reservation requests received during a predetermined period of time (for example, 5 minutes).

In step 1730, the electronic device 100 may perform the electric vehicle clustering. The electric vehicle cluster may be generated through the electric vehicle clustering. The electronic device 100 may generate a separate electric vehicle cluster for each charger cluster.

Figure 18:
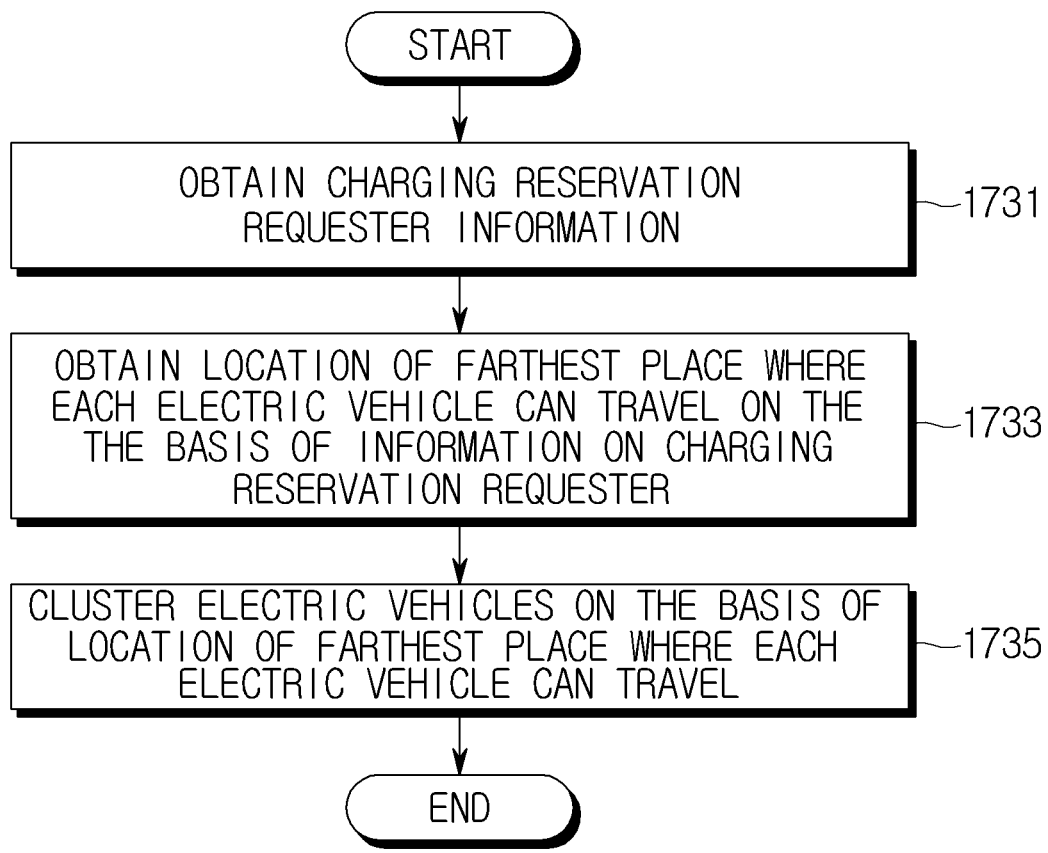
FIG. 18 is a flowchart showing an electric vehicle clustering operation of the electronic device 100 according to various embodiment.

FIG. 18 is a flowchart showing an electric vehicle clustering operation of the electronic device 100 according to various embodiment. Steps of the flowchart of FIG. 18 may be performed separately according to the charger cluster.

Referring to FIG. 18, in step 1731, the electronic device 100 may receive information of a requester requesting a charging reservation at a location within a corresponding charger cluster. The requester information may include an electric vehicle ID and destination of the requester, and the remaining charge status information.

In step 1733, the electronic device 100 may obtain a location of the farthest place where each electric vehicle can travel on the basis of the information of the requester requesting the charging reservation. For example, on the basis of the remaining charge status information included in the requester information, the maximum distance the electric vehicle can travel is estimated, and the location of the charger located farthest within the estimated maximum distance is obtained as the location of the farthest place where the electric vehicle can travel. Therefore, the location of the farthest place where the electric vehicle can travel may be limited to the location where the charger is located.

In step 1735, the electronic device 100 may perform the electric vehicle clustering on the basis of the location of the farthest place where each electric vehicle can travel. According to the embodiment of the present disclosure, the electronic device 100 may generate one electric vehicle cluster by collecting the electric vehicles of which the locations of the farthest places where they can travel are the same as each other.

Referring back to FIG. 17, in step 1740, the electronic device 100 may determine a charging priority between the electric vehicles. The electronic device 100 may determine the charging priority between the reservation-requested electric vehicles which are located within the charger cluster and have requested the reservation. The electronic device 100 may operate independently of each charger cluster.

Figure 19:
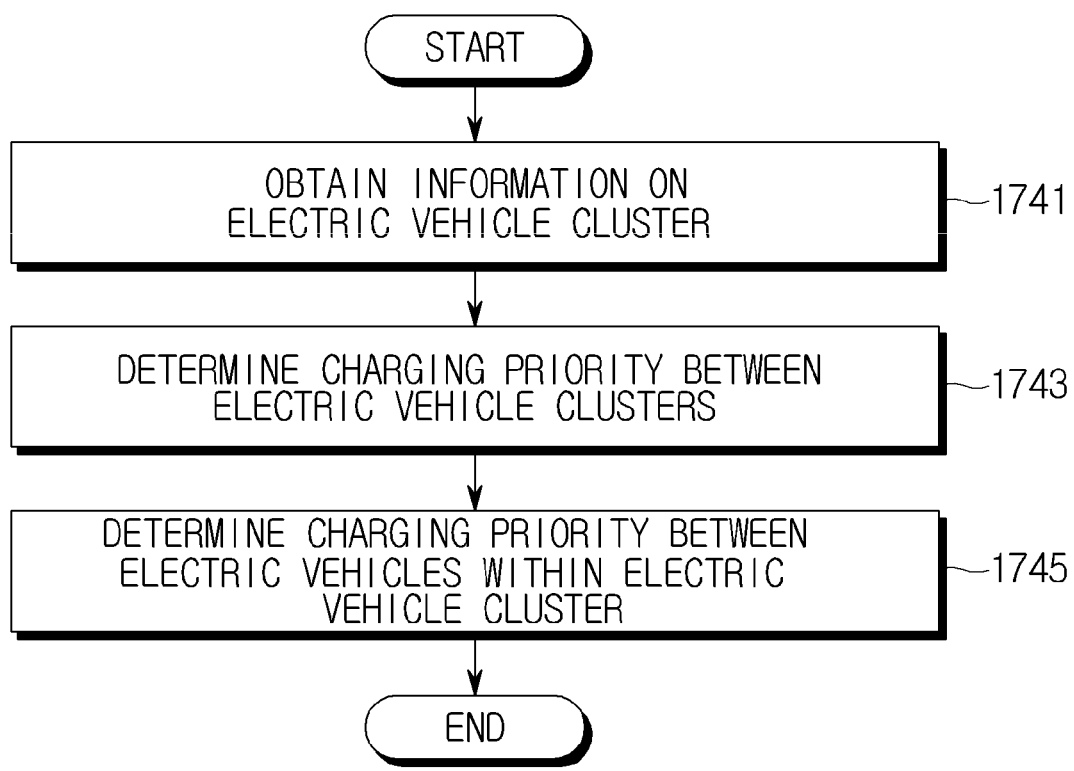
FIG. 19 is a flowchart showing an operation of the electronic device 100, which determines a charging priority among the electric vehicles in accordance with various embodiments.

FIG. 19 is a flowchart showing an operation of the electronic device 100, which determines a charging priority among the electric vehicles in accordance with various embodiments. Steps of the flowchart of FIG. 19 may be performed separately according to the charger cluster.

Referring to FIG. 19, in step 1741, the electronic device 100 may obtain information on the electric vehicle cluster generated in step 1730. Each electric vehicle cluster may be composed of the electric vehicles of which the locations of the farthest places where they can travel are the same as each other.

In step 1743, the electronic device 100 may determine the priority between the electric vehicle clusters. According to the embodiment of the present disclosure, the electronic device 100 may determine such that the electric vehicle cluster, among the electric vehicle clusters, in which the location of the farthest place where the electric vehicle can travel is close has a high priority.

In step 1745, the electronic device 100 may determine the priority among the electric vehicles within the electric vehicle cluster. According to the embodiment of the present disclosure, the highest priority may be given to the electric vehicle which has requested the reservation earliest among the electric vehicles within the electric vehicle cluster.

The electronic device 100 may set priorities for all the electric vehicles that have requested a charger reservation within the charger cluster by steps 1743 and 1745. For example, when there are three electric vehicle clusters of a first electric vehicle cluster, a second electric vehicle cluster, and a third electric vehicle cluster in the charger cluster and the locations of the farthest places where the electric vehicles of respective electric vehicle clusters can travel are 100 Km, 60 Km, and 90 Km in the order listed, the electronic device 100 may determine the priority in the order of the second electric vehicle cluster, the third electric vehicle cluster, and the first electric vehicle cluster on the basis of step 1743. In accordance with step 1745, the electronic device 100 may determine the priority of the electric vehicles included in the second electric vehicle cluster having the highest priority. Next, the electronic device 100 may determine the priority of the electric vehicles included in the third electric vehicle cluster, and finally may determine the priority of the electric vehicles included in the first electric vehicle cluster. Through steps 1743 and 1745, the electronic device 100 may determine a charger assignment priority for charging the electric vehicles of all the users who have requested the reservation.

Referring back to FIG. 17, in step 1750, the electronic device 100 may assign the chargers within the charger cluster to the reservation requesters in accordance with the priority. According to the embodiment of the present disclosure, the electronic device 100 may assign the closest available charger to the reservation requester. For example, the electronic device 100 may assign a charger at which the first electric vehicle can arrive earliest to the first electric vehicle of the second electric vehicle cluster, which has the highest priority. According to another embodiment of the present disclosure, the electronic device 100 assigns a charger to the reservation requester in accordance with the priority, however, may assign a charger which has as short a waiting time as possible from when each reservation requester arrives at the reserved charger to when starts charging.

After assigning chargers to all the reservation requesters, in step 1760, the electronic device 100 may confirm whether each reservation requester accepts the reservation while providing information on the assigned charger to the reservation requester. If the reservation requester accepts the reservation, the reservation is completed. If the reservation requester rejects the reservation, the reservation may be terminated without reserving the charger.

In step 1720, the electronic device 100 may determine whether there is an urgent reservation request to be preferentially processed. According to the embodiment of the present disclosure, when the electronic device 100 receives the urgent reservation request of the user or when there is one charger included within the location of the farthest place where the electric vehicle can travel on the basis of the remaining charge status of the reservation requester information, it is determined that there is an urgent reservation request. The electronic device 100 may give the highest priority to the electric vehicle of the user who has made the request determined as the urgent reservation request.

Figure 20:
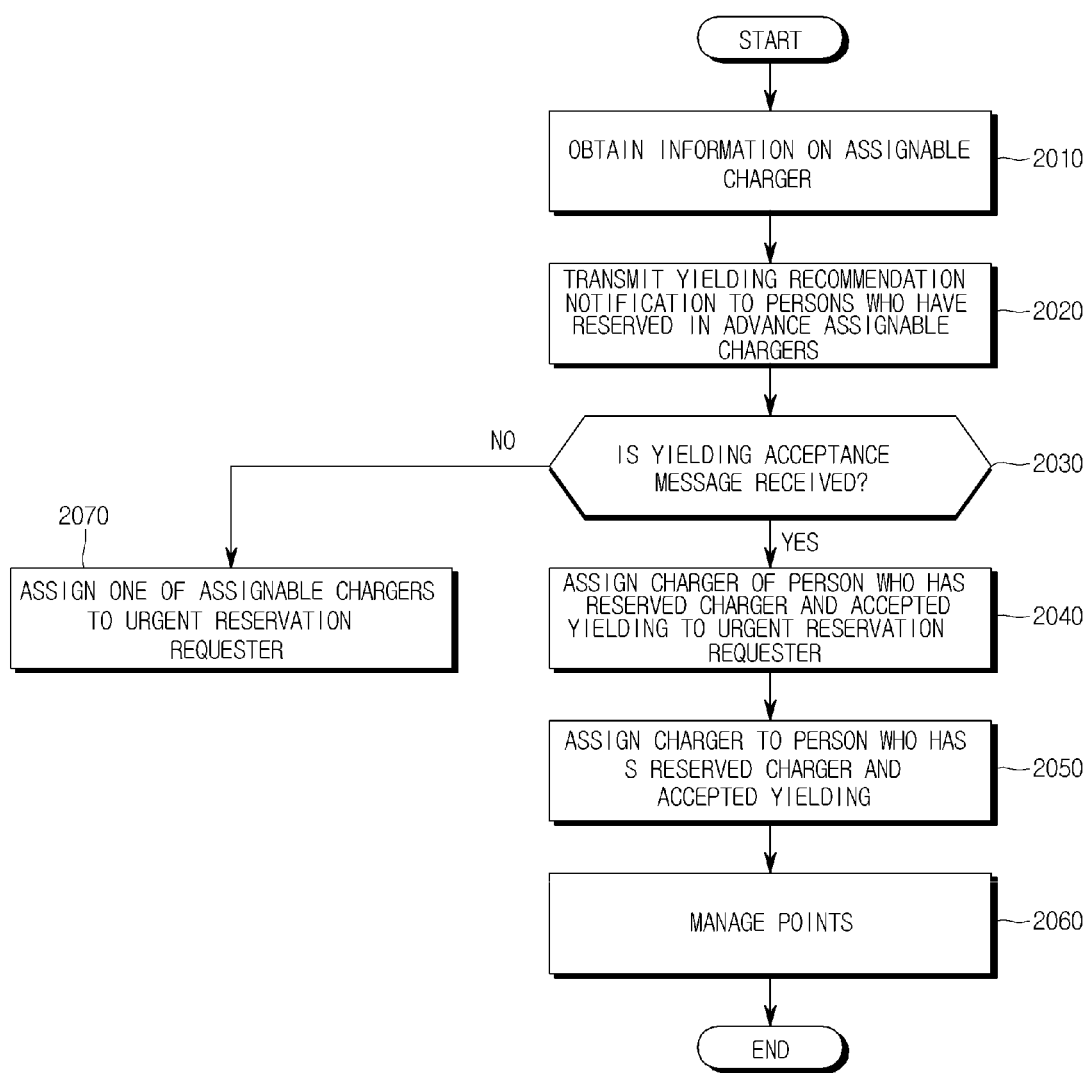
FIG. 20 is a flowchart showing an operation in which the electronic device 100 reserves the charger for an urgent reservation request in accordance with various embodiments.

FIG. 20 is a flowchart showing an operation in which the electronic device 100 reserves the charger for an urgent reservation request in accordance with various embodiments. Steps according to the flowchart shown in FIG. 20 can be implemented by the electronic device (e.g., the electronic device 100) or at least one processor of the electronic device (e.g., the processor 150 or the learning processor 140 of FIG. 1).

Referring to FIG. 20, in step 2010, when there is an urgent reservation request, the electronic device 100 may obtain information on the charger assignable for charging the electric vehicle of the urgent reservation requester. According to the embodiment of the present disclosure, the assignable charger may be a charger between a current location of the urgent reservation requester and the location of the farthest place where the electric vehicle can travel.

In step 2020, the electronic device 100 may transmit the yielding recommendation notification to persons who have reserved in advance the assignable chargers. According to the embodiment of the present disclosure, the electronic device 100 may transmit the yielding recommendation notification only to persons who have reserved and are in the "reservation waiting" state and may not transmit the yielding recommendation notification to persons who have reserved and are in in the "reservation determination" state.

In step 2030, the electronic device 100 may determine whether to receive the yielding acceptance message. If no yielding acceptance message is received, the electronic device 100 may assign one of the assignable chargers to the urgent reservation requester in step 2070. In this case, since there may be a higher priority person who has reserved, the urgent reservation requester may arrive at the location of the assigned charger and wait for the higher priority person who has reserved to complete charging. According to the embodiment of the present disclosure, the electronic device 100 may assign the closest charger among the chargers that can be assigned to the urgent reservation requester. According to another embodiment, the electronic device 100 may assign a charger that is determined to have the shortest waiting time for which the urgent reservation requester waits for the charger.

When the yielding acceptance message is received in step 2030, the electronic device 100 may assign the charger of a person who has reserved the charger and accepted the yielding to the urgent reservation requester in step 2040. In step 2050, the electronic device 100 may assign a charger to the person who has reserved the charger and accepted the yielding. According to the embodiment of the present disclosure, the electronic device 100 may reassign the yielded charger to the person who has reserved the charger and accepted the yielding. In this case, the person who has reserved the charger and accepted the yielding may have a lower priority than that of the urgent reservation requester. According to another embodiment of the present disclosure, the person who has reserved the charger and accepted the yielding may request a charging reservation again, and then the electronic device 100 may assign again, in accordance with steps 1720 to 1760, a charger to the person who has reserved the charger and accepted the yielding. In this case, a higher charger assignment priority than those of other reservation requesters may be given to the person who has reserved the charger and accepted the yielding.

In step 2060, the electronic device 100 may perform a point management. That is to say, the electronic device 100 may additionally provide points as a reward to the person who has reserved the charger and accepted the yielding and may receive additional costs as a penalty from the urgent reservation requester and accumulate them as public points.

According to various embodiments of the present disclosure, the electronic device 100 can improve the charger arrangement in accordance with the flowchart shown in FIG. 9 on the basis of cumulative results of the steps according to the flowchart of FIG. 17.

According to various embodiments of the present disclosure, the electronic device 100 may manage points of users as shown in FIG. 8.

According to various embodiments of the present disclosure, a method in which an electronic device (for example, the electronic device 100 of FIG. 1) assigns chargers for charging electric vehicles is provided. The method may comprise clustering chargers into at least one charger cluster, receiving charging reservation requests from the electric vehicles during a predetermined period of time, clustering the electric vehicles into at least one electric vehicle cluster based on the received charging reservation requests, determining a charging priority between the electric vehicles based on the at least one electric vehicle cluster and assigning the chargers to the electric vehicles based on the determined charging priority.

According to various embodiments of the present disclosure, the method may further comprise confirming whether or not to reserve the assigned charger.

According to various embodiments of the present disclosure, the clustering of the chargers into at least one charger cluster may comprise clustering the chargers based on locations of the chargers.

According to various embodiments of the present disclosure, the clustering the chargers into at least one charger cluster may comprise clustering the chargers based on a Support Vector Machine (SVM) algorithm on locations of the chargers and the route of the electric vehicles moving to the chargers.

According to various embodiments of the present disclosure, the clustering of the chargers into at least one charger cluster may be initiated based on a determination that no charger cluster corresponding to locations of the electric vehicles associated with the charging reservation requests, a determination of congestion on a road on which the electric vehicles are driving or a determination that a new charger has been installed.

According to various embodiments of the present disclosure, the clustering of the electric vehicles into at least one electric vehicle cluster may comprise obtaining information of the electric vehicles that have sent the charging reservation requests, determining a location of a farthest charger to which each of the electric vehicles is able to travel based on the obtained information of the electric vehicles and clustering the electric vehicles into the at least one electric vehicle cluster based on the determination of the farthest charger to which each of the electric vehicles is able to travel.

According to various embodiments of the present disclosure, the determining of the charging priority between the electric vehicles may comprise determining a first electric vehicle with a high charging priority based on the location of the farthest charger to which the first electric vehicle is able to travel being closer than that of other electric vehicles and determining a second electric vehicle with a high charging priority based on a determination that the second electric vehicle made an earliest charging reservation request among the electric vehicles.

According to various embodiments of the present disclosure, the assigning of chargers may comprise assigning a charger to the second electric vehicle having the high charging priority and assigning a closest charger to the first electric vehicle among the chargers of the at least one charger cluster.

According to various embodiments of the present disclosure, the method may further comprise obtaining an urgent charging reservation request and assigning a charger to an electric vehicle that has made the urgent charging reservation request in response to the urgent charging reservation request.

According to various embodiments of the present disclosure, the obtaining an urgent charging reservation request may comprise receiving the urgent charging reservation request from the user or determining the urgent charging reservation request on the basis of information on the received charging reservation request.

According to various embodiments of the present disclosure, the assigning a charger to an electric vehicle that has made the urgent charging reservation request in response to the urgent charging reservation request may comprise obtaining information on the charger assignable to the electric vehicle which has made the urgent charging reservation request, transmitting the yielding recommendation notification to persons who have reserved in advance the assignable chargers, determining whether to receive a yielding acceptance message, assigning the charger reserved by the electric vehicle which has transmitted the yielding acceptance message to the electric vehicle which has made the urgent charging reservation request, when the yielding acceptance message is received as a result of the determination, and assigning one of the assignable chargers to the electric vehicle which has made the urgent charging reservation request, when no yielding acceptance message is received as a result of the determination.

According to various embodiments of the present disclosure, the assigning a charger to an electric vehicle that has made the urgent charging reservation request in response to the urgent charging reservation request may further comprise assigning a charger for the electric vehicle which has transmitted the yielding acceptance message when the yielding acceptance message is received as a result of the determination.

According to various embodiments of the present disclosure, the method may further comprise managing points that can be given to the user as rewards and penalties.

According to various embodiments of the present disclosure, the managing points that can be given to the user as rewards and penalties may comprise accumulating a predetermined amount as a fee for preferential use in the common point account when a charger is yielded to the electric vehicle which has made the urgent charging reservation request, accumulating a predetermined amount as a reward in in the individual point account of the user of the electric vehicle which has transmitted the yielding acceptance message, accumulating a portion of a charging fare in the individual point account of the user when the user who has reserved the charger performs charging according to a reservation time, accumulating a predetermined amount as a penalty in the common point account when the user who has reserved the charger arrives at the charger more than a first predetermined time later than the reservation time and charges, and accumulating the prepaid amount in the common point account when the user who has reserved the charger does not charge by the corresponding charger and the reservation is canceled due to the lapse of a second predetermined time.

According to various embodiments of the present disclosure, the operations may be performed based on Stanford research institute problem solver (STRIPS).

According to various embodiments of the present disclosure, the method may further comprise providing a charger arrangement improvement by performing an expectation-maximization algorithm based on charger assignments accumulated previously.

As described above, through the apparatus and method proposed in the present disclosure, an efficient charging reservation is proposed to a user, so that it is possible to help the user utilize time efficiently. Also, the efficiency of the use of each charger is maximized and the degree of use of each charger is normalized, so that it is possible to prevent the breakdown, etc., of a specific charger caused by the frequent use of the specific charger.

What is claimed is:

1. A method for assigning chargers to electric vehicles, the method comprising:
   clustering chargers into at least one charger cluster;
   receiving charging reservation requests from the electric vehicles during a predetermined period of time;
   clustering, based on the received charging reservation requests, the electric vehicles into at least one electric vehicle cluster;
   determining, based on the at least one electric vehicle cluster, a charging priority between the electric vehicles; and
   assigning, based on the determined charging priority, the chargers to the electric vehicles.

2. The method of claim 1, further comprising confirming, by the electric vehicles, whether or not to reserve the assigned chargers.

3. The method of claim 1, wherein the clustering of the chargers into at least one charger cluster comprises clustering the chargers based on locations of the chargers.

4. The method of claim 1, wherein the clustering of the chargers into at least one charger cluster comprises clustering the chargers based on performing a Support Vector Machine (SVM) algorithm on locations of the chargers and routes of the electric vehicles moving to the chargers.

5. The method of claim 1, wherein the clustering of the chargers into at least one charger cluster is initiated based on:
   a determination that no charger cluster corresponds to locations of the electric vehicles associated with the charging reservation requests;
   a determination of congestion on a road on which the electric vehicles are driving; or
   a determination that a new charger has been installed.

6. The method of claim 1, wherein the clustering of the electric vehicles into at least one electric vehicle cluster comprises:
   obtaining information of the electric vehicles that have sent the charging reservation requests;
   determining, based on the obtained information of the electric vehicles, a location of a farthest charger to which each of the electric vehicles is able to travel; and
   clustering the electric vehicles into the at least one electric vehicle cluster based on the determination of the farthest charger to which each of the electric vehicles is able to travel.

7. The method of claim 6, wherein the determining of the charging priority between the electric vehicles comprises:
   determining a first electric vehicle with a high charging priority based on the location of the farthest charger to which the first electric vehicle is able to travel being closer than that of other electric vehicles; and
   determining a second electric vehicle with a high charging priority based on a determination that the second electric vehicle made an earliest charging reservation request among the electric vehicles.

8. The method of claim 7, wherein the assigning of chargers comprises:
   assigning a charger to the second electric vehicle having the high charging priority; and
   assigning a closest charger to the first electric vehicle among the chargers of the at least one charger cluster.

9. The method of claim 1, wherein the operations are performed based on a Stanford Research Institute Problem Solver (STRIPS).

10. The method of claim 1, further comprising providing a charger arrangement improvement by performing an expectation-maximization algorithm based on charger assignments accumulated previously.

11. An electronic device comprising:
   a communication device configured to receive charging reservation requests from electric vehicles;
   a memory configured to store data and programs required for operation; and
   at least one processor configured to connect to the communication device and the memory,
   wherein the at least one processor is configured to perform operations including:
      clustering chargers into at least one charger cluster and storing the at least one charger cluster in the memory;
      receiving the charging reservation requests from the electric vehicles through the communication device during a predetermined period of time;
      clustering, based on the received charging reservation requests, the electric vehicles into at least one electric vehicle cluster;
      determining, based on the at least one electric vehicle cluster, a charging priority between the electric vehicles; and assigning, based on the determined charging priority, the chargers to the electric vehicles.

12. The electronic device of claim 11, wherein the at least one processor is further configured to perform operation of receiving confirmations whether or not to reserve the assigned charger from the electric vehicles.

13. The electronic device of claim 11, wherein the clustering of the chargers into at least one charger cluster comprises clustering the chargers based on locations of the chargers.

14. The electronic device of claim 11, wherein the clustering of the chargers into at least one charger cluster comprises clustering the chargers based on performing a Support Vector Machine (SVM) algorithm on locations of the chargers and routes of the electric vehicles moving to the chargers.

15. The electronic device of claim 11, wherein the clustering of the chargers into at least one charger cluster is initiated based on:
- a determination that no charger cluster corresponds to locations of the electric vehicles associated with the charging reservation requests;
- a determination of congestion on a road on which the electric vehicles are driving; or
- a determination that a new charger has been installed.

16. The electronic device of claim 11, wherein the at least one processor is further configured to perform operations including:
- obtaining information of the electric vehicles that have sent the charging reservation request;
- determining, based on the obtained information of the electric vehicles, a location of a farthest charger to which each of the electric vehicles is able to travel; and
- clustering the electric vehicles into the at least one electric vehicle cluster based on the determination of the farthest charger to which each of the electric vehicles is able to travel.

17. The electronic device of claim 16, wherein the at least one processor is further configured to perform operations including:
- determining a first electric vehicle with a high charging priority based on the location of the farthest charger to which the first electric vehicle is able to travel being closer than that of other electric vehicles; and
- determining a second electric vehicle with a high charging priority based on a determination that the second electric vehicle made an earliest charging reservation request among the electric vehicles.

18. The electronic device of claim 17, wherein the at least one processor is configured to perform operations including:
- assigning a charger to the second electric vehicle having the high charging priority; and
- assigning a closest charger to the first corresponding electric vehicle among the chargers of the at least one charger cluster.

19. The electronic device of claim 11, wherein the at least one processor is configured to perform the operations based on a Stanford Research Institute Problem Solver (STRIPS).

20. The electronic device of claim 11, wherein the at least one processor is configured to provide a charger arrangement improvement by performing an expectation-maximization algorithm based on charger assignments accumulated previously.

* * * * *